United States Patent
Shiono et al.

(10) Patent No.: US 10,025,085 B2
(45) Date of Patent: Jul. 17, 2018

(54) IMAGE GENERATION DEVICE AND IMAGE GENERATION METHOD

(71) Applicant: Panasonic Intellectual Property Management Co., Ltd., Osaka (JP)

(72) Inventors: Teruhiro Shiono, Osaka (JP); Keiichi Matsuzaki, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 178 days.

(21) Appl. No.: 14/431,250

(22) PCT Filed: Nov. 29, 2013

(86) PCT No.: PCT/JP2013/007037
§ 371 (c)(1),
(2) Date: Mar. 25, 2015

(87) PCT Pub. No.: WO2014/087624
PCT Pub. Date: Jun. 12, 2014

(65) Prior Publication Data
US 2015/0219888 A1   Aug. 6, 2015

(30) Foreign Application Priority Data

Dec. 5, 2012  (JP) ................. 2012-266113

(51) Int. Cl.
*H04N 9/47* (2006.01)
*G01B 9/02* (2006.01)
(Continued)

(52) U.S. Cl.
CPC ....... *G02B 21/361* (2013.01); *G02B 21/0056* (2013.01); *G02B 21/14* (2013.01); *G02B 21/18* (2013.01)

(58) Field of Classification Search
USPC .................................. 356/450, 456
See application file for complete search history.

(56) References Cited

U.S. PATENT DOCUMENTS

| 5,083,869 A | 1/1992 | Nakata et al. |
| 5,943,134 A | 8/1999 | Yamaguchi et al. |

(Continued)

FOREIGN PATENT DOCUMENTS

| CN | 1924633 | 3/2007 |
| CN | 102096180 | 6/2011 |

(Continued)

OTHER PUBLICATIONS

International Search Report dated Mar. 4, 2014 in International (PCT) Application No. PCT/JP2013/007037.

*Primary Examiner* — Hung Dang
(74) *Attorney, Agent, or Firm* — Wenderoth, Lind & Ponack, L.L.P.

(57) ABSTRACT

The present application discloses image generation device for generating sample image representing sample. The image generation device includes laser source portion which emits laser beam, convertor for converting laser beam into multiplexed beam, in which reflected beam after reflection of laser beam by sample and reference beam after modulation of phase of the laser beam are multiplexed, first signal generator which generates first detection signal corresponding to light quantity of multiplexed beam, image generator which generates sample image, and modulator which modulates the phase to cause periodic variation of light quantity of multiplexed beam. The first detection signal includes signal component representing change from increase to decrease in the periodic variation. The image generator uses signal component to generate sample image.

21 Claims, 26 Drawing Sheets

(51) Int. Cl.
*G01J 3/45* (2006.01)
*G02B 21/36* (2006.01)
*G02B 21/14* (2006.01)
*G02B 21/18* (2006.01)
*G02B 21/00* (2006.01)

(56) References Cited

U.S. PATENT DOCUMENTS

| | | | | |
|---|---|---|---|---|
| 6,693,945 | B1* | 2/2004 | Shimada | G02B 21/002 372/22 |
| 2005/0046905 | A1* | 3/2005 | Aizaki | G02B 21/365 358/296 |
| 2007/0183292 | A1* | 8/2007 | Ujiie | G11B 7/139 369/112.01 |
| 2008/0186476 | A1* | 8/2008 | Kusunose | G01N 21/956 356/73 |
| 2009/0046298 | A1* | 2/2009 | Betzig | G01N 21/6445 356/521 |
| 2010/0168586 | A1* | 7/2010 | Hillman | G02B 23/2476 600/476 |
| 2011/0102572 | A1* | 5/2011 | Kihara | G02B 21/244 348/79 |
| 2011/0140000 | A1 | 6/2011 | Iketaki | |
| 2013/0021616 | A1 | 1/2013 | Kimura | |
| 2013/0083322 | A1* | 4/2013 | Iketaki | G01N 21/65 356/301 |
| 2013/0265586 | A1* | 10/2013 | Ohara | G01B 9/02067 356/498 |

FOREIGN PATENT DOCUMENTS

| | | |
|---|---|---|
| JP | 61-140914 | 6/1986 |
| JP | 2-36338 | 2/1990 |
| JP | 9-101460 | 4/1997 |
| JP | 10-2855 | 1/1998 |
| JP | 10-62139 | 3/1998 |
| JP | 11-109253 | 4/1999 |
| JP | 2002-40329 | 2/2002 |
| JP | 2010-139951 | 6/2010 |
| JP | 2013-24951 | 2/2013 |

\* cited by examiner

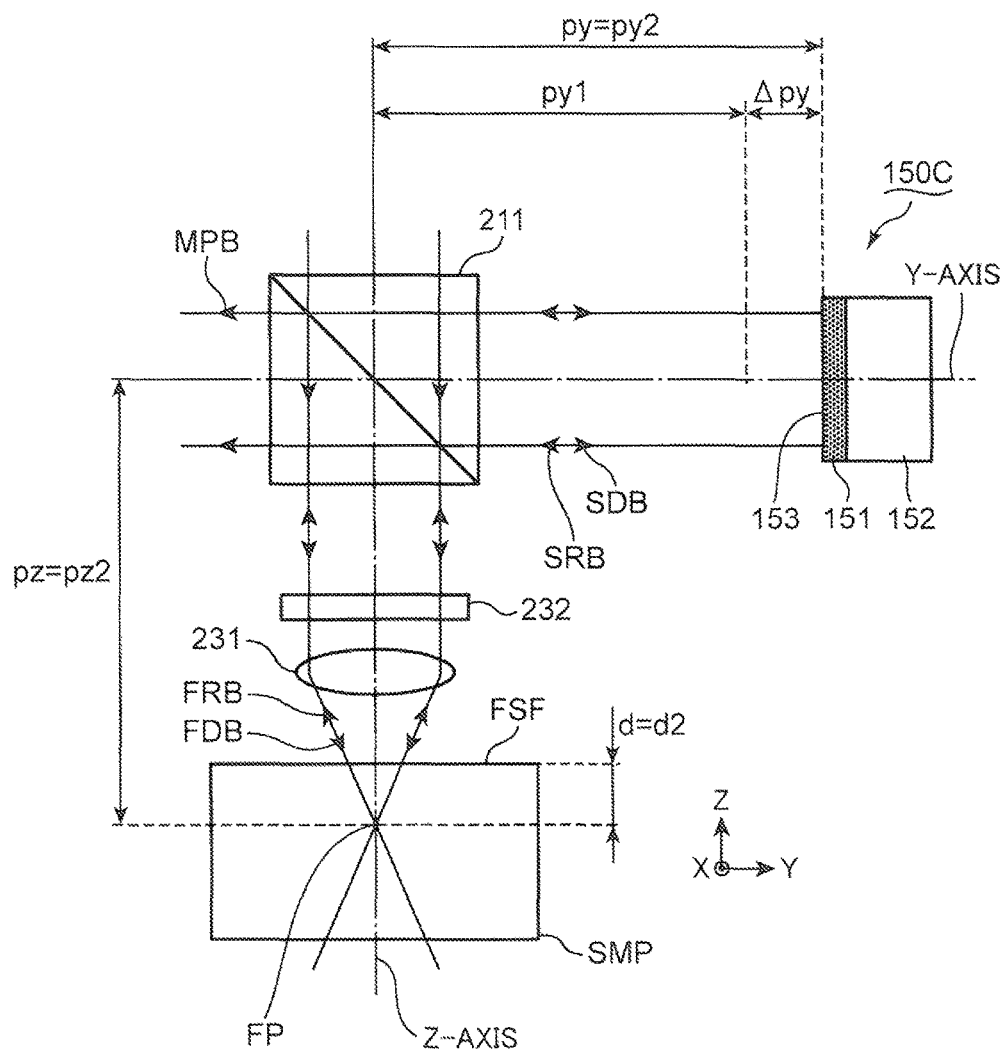

IMAGE GENERATION DEVICE AND IMAGE GENERATION METHOD

TECHNICAL FIELD

The present invention relates to techniques for generating images.

BACKGROUND ART

For the purpose of pathological diagnosis, a living cell may be microscopically observed. In many cases, a living cell has to be sliced to a thickness of several micrometers to 10 micrometers.

When a living cell is observed without being sliced, an observation operation becomes more efficient in terms of time. Accordingly, observation techniques without slicing a living cell are expected.

A confocal microscope may be used for observation of a sample such as a living cell (c.f. Patent Document 1). The confocal microscope is excellent in resolution in an optical axis direction.

The confocal microscope includes an objective lens, a detection lens, a pinhole member and a detector. The objective lens condenses a beam toward a sample. The sample reflects the beam condensed by the objective lens. The detection lens condenses a reflected beam from the sample. The pinhole member is arranged so that a pinhole formed in the pinhole member coincides with a position at which the detection lens makes the beam condensed. The detector detects the reflected beam passing through the pinhole. Accordingly, there is a high resolution in the depth direction of the sample. Consequently, it is not necessary to thinly slice the sample.

In general, a living cell has high transparency and low reflectance. In addition, there is a very small change in refractive index of a living cell. Accordingly, the detector may detect very small power or light quantity of the reflected beam. Consequently, the resultant image is likely to be dark.

It may be considered that an increase in power of a light source emitting a beam toward the sample results in an increase in a light quantity of the reflected beam. The increase in power of the light source, however, may result in optical or thermal damage to a sample such as a living cell. Therefore, the increase in power of the light source may not be a suitable method for acquiring a bright image.

The aforementioned problems are common not only to observation of a living cell but also to observation of another sample which causes little reflected light.

Patent Document 1: JP S61-140914 A

SUMMARY OF INVENTION

An object of the present invention is to provide techniques which may generate a bright sample image.

An image generation device according to one aspect of the present invention includes a laser source portion configured to emit a laser beam, a convertor configured to convert the laser beam to a multiplexed beam, in which a reflected beam resulting from reflection of the laser beam by the sample and a reference beam resulting from modulation of a phase of the laser beam are multiplexed, a first signal generator configured to generate a first detection signal in correspondence to a light quantity of the multiplexed beam, an image generator configured to generate the sample image, and a modulator configured to modulate the phase to cause a periodic variation in the light quantity of the multiplexed beam. The first detection signal includes a signal component representing a change from an increase to a decrease in the periodic variation. The image generator uses the signal component to generate the sample image.

An image generation method according to another aspect of the present invention is used to generate a sample image representing a sample. The image generation method includes an emission step of emitting a laser beam, a conversion step of converting the laser beam into a multiplexed beam, in which a reflected beam resulting from reflection of the laser beam by the sample and a reference beam resulting from modulation of a phase of the laser beam are multiplexed, a first signal generation step of generating a first detection signal in correspondence to a light quantity of the multiplexed beam, and an image generation step of generating the sample image. The conversion step includes modulating the phase to cause a periodic variation of the light quantity. The first signal generation step includes generating a signal component representing a change from an increase to a decrease in the periodic variation. The image generation step includes using the signal component to generate the sample image.

The present invention may generate a bright sample image.

Objects, features and advantages of the present invention become apparent from the following detailed description taken with the accompanying drawings.

BRIEF DESCRIPTION OF DRAWINGS

FIG. 9B is a schematic view of the modulator of the image generation device shown in FIG. 6.

DESCRIPTION OF EMBODIMENTS

Figure 1:
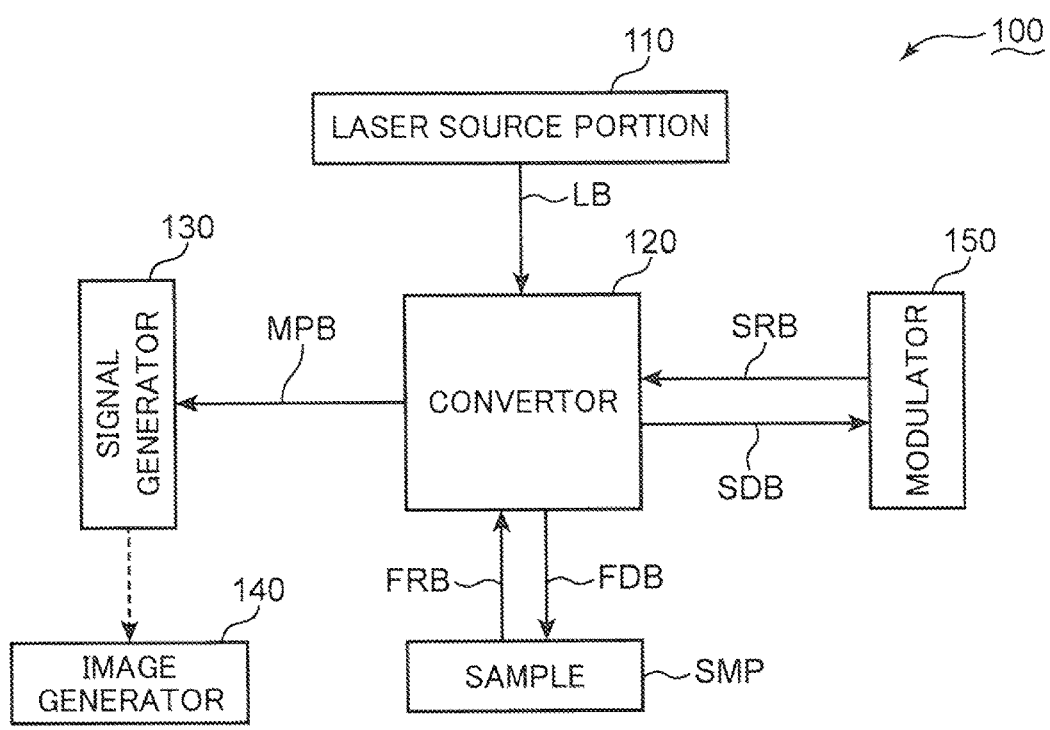
FIG. 1 is a schematic block diagram of an image generation device according to the first embodiment.

Various features about image generation techniques are described below with reference to the drawings. The same components are designated by the same reference numerals in the following embodiments. For clarity of the description, a repetitive description is omitted as necessary. Configurations, layouts or shapes shown in the drawings or description about the drawings are intended to make principles of the following embodiments easily understood. Therefore, the principles of the following embodiments are not limited thereto.

<First Embodiment>

Techniques which use a high-coherence beam to generate a sample image are described in the present embodiment. The term "high-coherence beam" may mean a beam having a coherence length of not less than 50 μm in the following description. A laser beam is exemplified as the high-coherence beam.

Unlike the image generation techniques of the present embodiment, many of conventional techniques use a low-coherence beam or an incoherent beam (c.f. JP H10-2855 A (hereinafter referred to as Reference Document 1)). The term "low-coherence beam" may mean a beam having a coherence length larger than 10 μm and less than 50 μm in the following description. The term "incoherent beam" may mean a beam having a coherence length less than 10 μm. The definitions of the terms "high-coherence beam", "low-coherence beam" and "incoherent beam" do not limit the principle of the present embodiment.

Reference Document 1 discloses a measurement device which uses a low-coherence beam or an incoherent beam to measure a refractive index and film thickness of a laminated structure. Since the measurement device in Reference Document 1 is used to measure the refractive index and the film thickness, the measurement device is not directly related to the techniques of the present embodiment for generating images. The techniques disclosed in Reference Document 1, however, will be briefly described below as optical techniques which use a low-coherent beam or an incoherent beam.

The measurement device in Reference Document 1 includes an LED, a reference mirror and a detector. The LED emits a low-coherence beam. The low-coherence beam emitted from the LED is sequentially condensed at a plurality of positions in a sample. The reference mirror is displaced for each of the positions at which the beam is condensed. As described above, the low-coherence has a short coherence length so that intensity of interfering light decreases with the displacement of the reference mirror. The interfering light changes in amplitude because of the decrease in the intensity of the interfering light. The detector detects a maximum value of the amplitude of the interfering light.

The measurement device measures peak intervals from the detected maximum value data in a displacement direction of the reference mirror. In addition, the measurement device measures intervals between positions at which the beam is condensed (localized position intervals). The measurement device calculates the refractive index and film thickness of the sample from the peak intervals and the localized position intervals.

As described above, the use of the low-coherence beam results in the decrease in the intensity of the interfering light resulting from the displacement of the reference mirror. If the data used to calculate the refractive index is extracted from a data range in correspondence to the decreased intensity, the maximum value of the amplitude of the interfering light may not be appropriately detected. The improper detection of the maximum value may cause a significant problem for generating bright images although the improper detection may not be important in calculating the refractive index and film thickness of the sample.

(Image Generation Device)

FIG. 1 is a schematic block diagram of an image generation device 100 according to the first embodiment. The image generation device 100 is described with reference to FIG. 1. Each of the solid arrows in FIG. 1 represents beam propagation. The dotted arrow in FIG. 1 represents signal transmission.

The image generation device 100 includes a laser source portion 110, a convertor 120, a signal generator 130, an image generator 140 and a modulator 150. The laser source portion 110 emits a laser beam LB to the convertor 120. The convertor 120 demultiplexes the laser beam LB into a first demultiplexed beam FDB and a second demultiplexed beam SDB. The first demultiplexed beam FDB propagates toward a sample SMP. A part of the first demultiplexed beam FDB then becomes a first reflected beam FRB which is reflected by the sample SMP. The first reflected beam FRB propagates toward the convertor 120. The second demultiplexed beam SDB propagates toward the modulator 150. The modulator 150 modulates a phase of the second demultiplexed beam SDB and reflects the second &multiplexed beam SDB to generate a second reflected beam SRB. The second reflected beam SRB is used as a reference beam for the first reflected beam FRB. Like the first reflected beam FRB, the second reflected beam SRB also propagates toward the convertor 120. The convertor 120 multiplexes the first and second reflected beams FRB, SRB to generate a multiplexed beam MPB. The multiplexed beam MPB propagates from the convertor 120 to the signal generator 130. The signal generator 130 generates a detection signal in correspondence to a light quantity of the multiplexed beam MPB. The detection signal is output from the signal generator 130 to the image generator 140. The image generator 140 uses the detection signal to generate a sample image which represents the sample. In the present embodiment, the first signal generator is exemplified by the signal generator 130. The first detection signal is exemplified by the detection signal. The reflected beam is exemplified by the first reflected beam FRB.

The laser source portion 110 may have one laser source. Alternatively, the laser source portion 110 may have a plurality of laser sources. Different laser beams in hue or wavelength may be emitted if the laser source portion 110 has a plurality of the laser sources. The principles of the present embodiment are not limited to a structure of the laser source portion 110.

As described above, the convertor 120 has a function of converting the laser beam LB into the multiplexed beam MPB. Various optical designs for converting the laser beam LB into the multiplexed beam MPB may be applied to the convertor 120. The principles of the present embodiment are not limited to a structure of the convertor 120.

Various detection elements configured to detect a light quantity of the multiplexed beam MPB are applicable to the signal generator 130. The principles of the present embodiment are not limited to a structure of the signal generator 130.

The image generator 140 may generate a sample image on the basis of known image formation techniques. Therefore, the principles of the present embodiment are not limited by details of an algorithm for generating the sample image.

The modulator 150 may change an optical path length of the second demultiplexed beam SDB to cause phase modulation. Alternatively, the modulator 150 may use a change in refractive index to cause the phase modulation. The principles of the present embodiment are not limited to a phase modulation technique.

Figure 2:
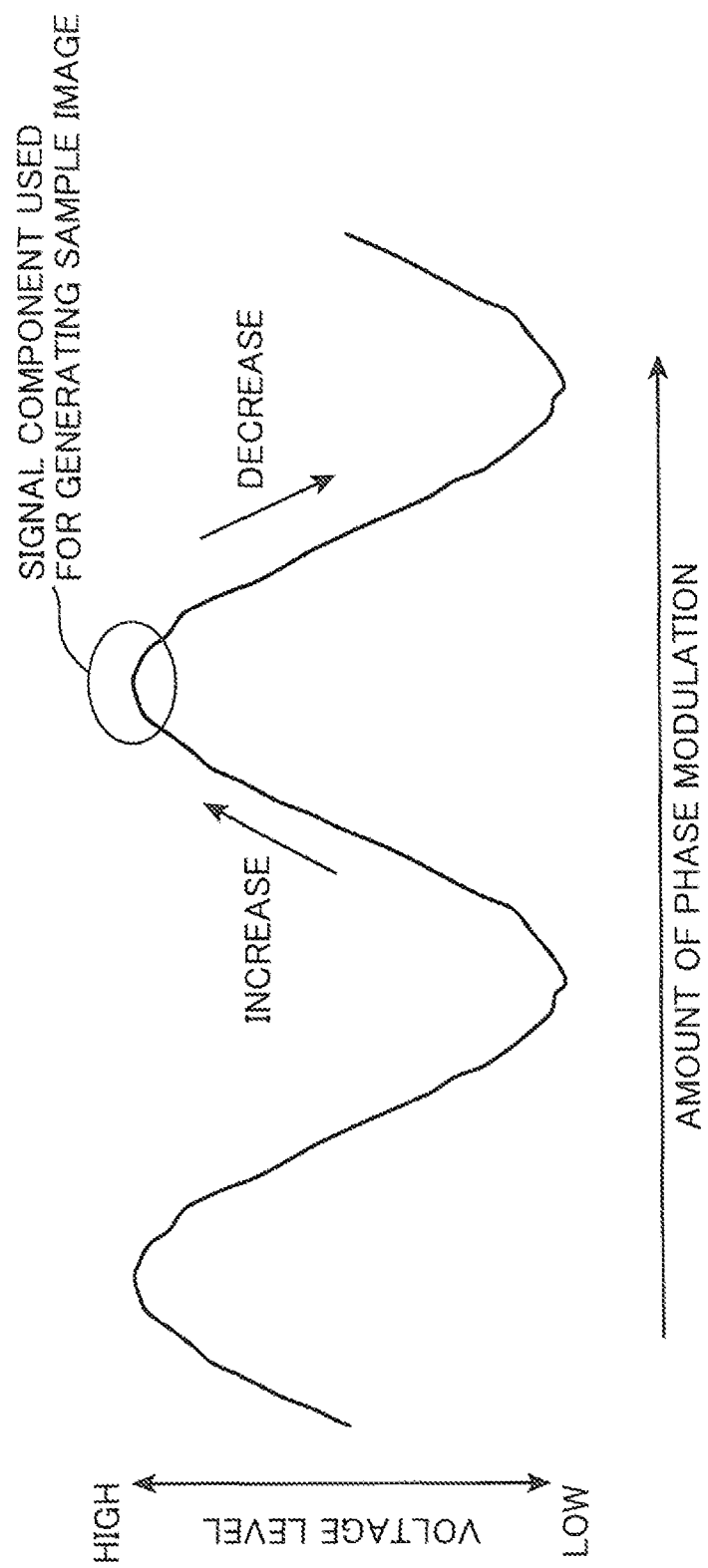
FIG. 2 is a schematic view of an exemplary detection signal output from a signal generator of the image generation device shown in FIG. 1.

FIG. 2 is a schematic view of an exemplary detection signal output from the signal generator 130. The image generation device 100 is further described with reference to FIGS. 1 and 2.

The signal generator 130 may output a voltage signal as the detection signal. A high voltage level may mean a large light quantity of the multiplexed beam MPB. A low voltage level may mean a small light quantity of the multiplexed beam MPB.

The light quantity of the multiplexed beam MPB periodically varies while the modulator 150 increases an amount of phase modulation. Accordingly, the voltage level of the voltage signal output from the signal generator 130 also periodically varies, as shown in FIG. 2.

The image generator 140 extracts a signal component from the detection signal, which is output from the signal generator 130, the signal component representing a change from an increase to a decrease in a light quantity of the multiplexed beam MPB. The image generator 140 uses the extracted signal component to generate a sample image.

The extracted signal component may be signal data representing a maximum value of the light quantity which periodically varies. Alternatively, the signal component may represent a maximum value of the light quantity identified in an envelope curve drawn on the basis of the signal data in a predetermined signal section. Alternatively, the signal component may be an average value in a data range of a predetermined length representing a change from an increase to a decrease in a light quantity of the multiplexed beam MPB. The image generator 140 uses the signal component to generate the sample image, the signal component being acquired when the light quantity of the multiplexed beam MPB is substantially maximized. Therefore, noise removal processes and other calculation techniques for the detection signal output from the signal generator 130 do not limit the principles of the present embodiment.

Unlike the techniques disclosed in Reference Document 1 described above, the laser source portion 110 emits the laser beam LB having a long coherence length. Accordingly, the amplitude of the periodic variation of the voltage level is more stable to a variation in phase modulation amount. Therefore, under the principles of the present embodiment, the signal component suitable for generating a sample image is obtained when signal data representing a variation in voltage signal over one period is obtained.

(Image Generation Method)

Figure 3:
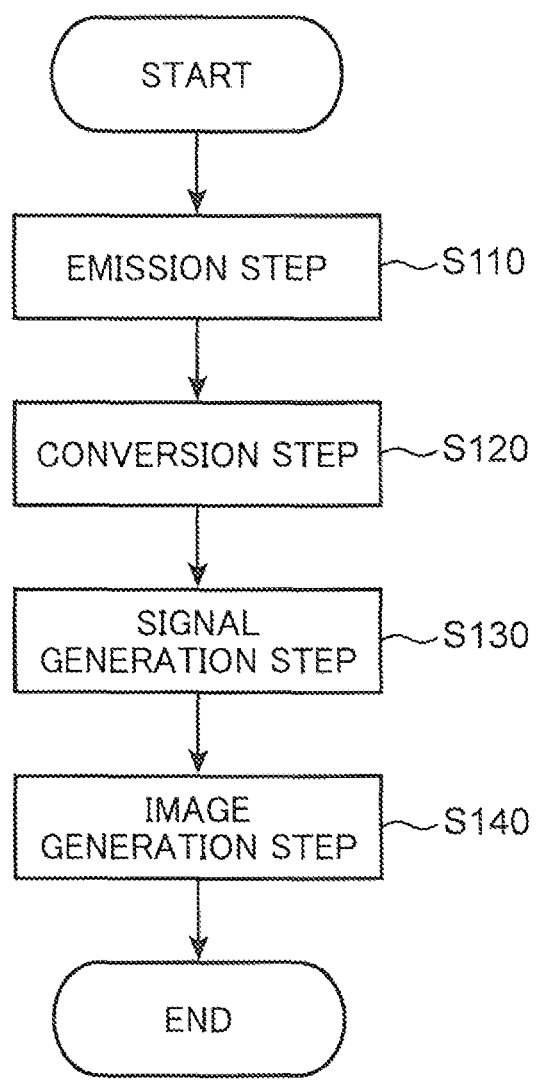
FIG. 3 is a schematic flow chart of an image generation method for generating a sample image representing a sample.

FIG. 3 is a schematic flow chart of an image generation method for generating a sample image representing the sample SMP. The image generation method is described with reference to FIGS. 1 to 3.

(Step S110)

In Step S110, the laser source portion 110 emits the laser beam LB to the convertor 120. Then, Step S120 is performed.

(Step S120)

In Step S120, the convertor 120 demultiplexes the laser beam LB into the first and second demultiplexed beams FDB, SDB. A part of the first &multiplexed beam FDB is reflected by the sample SMP to become the first reflected beam FRB. The second demultiplexed beam SDB is reflected by the modulator 150 to become the second reflected beam SRB. Meanwhile, the modulator 150 modulates the phase. The convertor 120 multiplexes the first and second reflected beams FRB, SRB to generate the multiplexed beam MPB. In short, in Step S120, the laser beam LB is converted into the multiplexed beam MPB. As a result of the aforementioned phase modulation process by the modulator 150, the light quantity of the multiplexed beam MPB periodically varies. After the generation of the multiplexed beam MPB, Step S130 is performed.

(Step S130)

In Step S130, the signal generator 130 generates a detection signal in correspondence to a light quantity of the multiplexed beam MPH. As described with reference to FIG. 2, the detection signal includes the signal component representing a change from an increase to a decrease in the periodic variation in light quantity of the multiplexed beam MPB. When the detection signal is output from the signal generator 130 to the image generator 140, Step S140 is performed. In the present embodiment, the first signal generation step is exemplified by Step S130.

(Step S140)

In Step S140, the image generator 140 extracts the signal component from the detection signal, the signal component representing a change from an increase to a decrease in the periodic variation in light quantity of the multiplexed beam MPB. The image generator 140 uses the extracted signal component to generate the sample image.

<Second Embodiment>

There is an interference microscope which uses a high-coherence beam (c.f. JP H11-109253 A (hereinafter referred to as Reference Document 2)).

The reference microscope in Reference Document 2 includes a laser source, a reference mirror and a piezoelectric element. The piezoelectric element moves the reference mirror. As a result of the movement of the reference mirror, a variety of interfering light is generated. Accordingly, a plurality of interference fringes is generated. The interference microscope detects a variation in interference fringe so that an observer may observe a minute surface structure.

Since the interference microscope detects the variation in a plurality of interference fringes, a large light quantity is required. Accordingly, the interference microscope has to collect all the beams spreading in an optical axis direction.

It is known that a resolution in the depth direction of a sample depends on a coherence length. A short coherence length results in a high resolution. A long coherence length results in a low resolution. Accordingly, in terms of a high resolution, the techniques disclosed in Reference Document 1 using the low-coherence length is more likely to achieve a high resolution than the techniques disclosed in Reference Document 2. The techniques disclosed in Reference Document 1 use attenuation in intensity of the interfering light resulting from the use of the low-coherence beam or incoherent beam. Therefore, the techniques disclosed in Reference Document 2 are not applicable to the techniques disclosed in Reference Document 1. The techniques disclosed in Reference Document 2 use interference fringes resulting from the use of the high-coherence beam. Therefore, the techniques disclosed in Reference Document 1 are not applicable to the techniques disclosed, in Reference Document 2.

The present inventors have figured out that a high resolution may be obtained when a part of a multiplexed beam generated under usage of a high-coherence beam is selectively used. The findings of the present inventors are contradictory to the knowledge obtained from the aforementioned interference microscope which has to collect all the beams spreading in the optical axis direction.

When the interference microscope selectively uses some of the optical components, an amount of the available beam is too small to detect variations in a plurality of interference fringes. Consequently, an observer may not observe a minute surface structure.

In addition, since the interference microscope detects a variation in a plurality of interference fringes, the interference microscope may not condense a beam toward an intended depth position in a sample. Consequently, an image generated on the basis of the techniques disclosed in Reference Document 2 is obtained under a condition that the beam is dispersed in the depth direction. Therefore, the interference microscope in Reference Document 2 faces problems about a low resolution in the depth direction of a sample.

Figure 4:
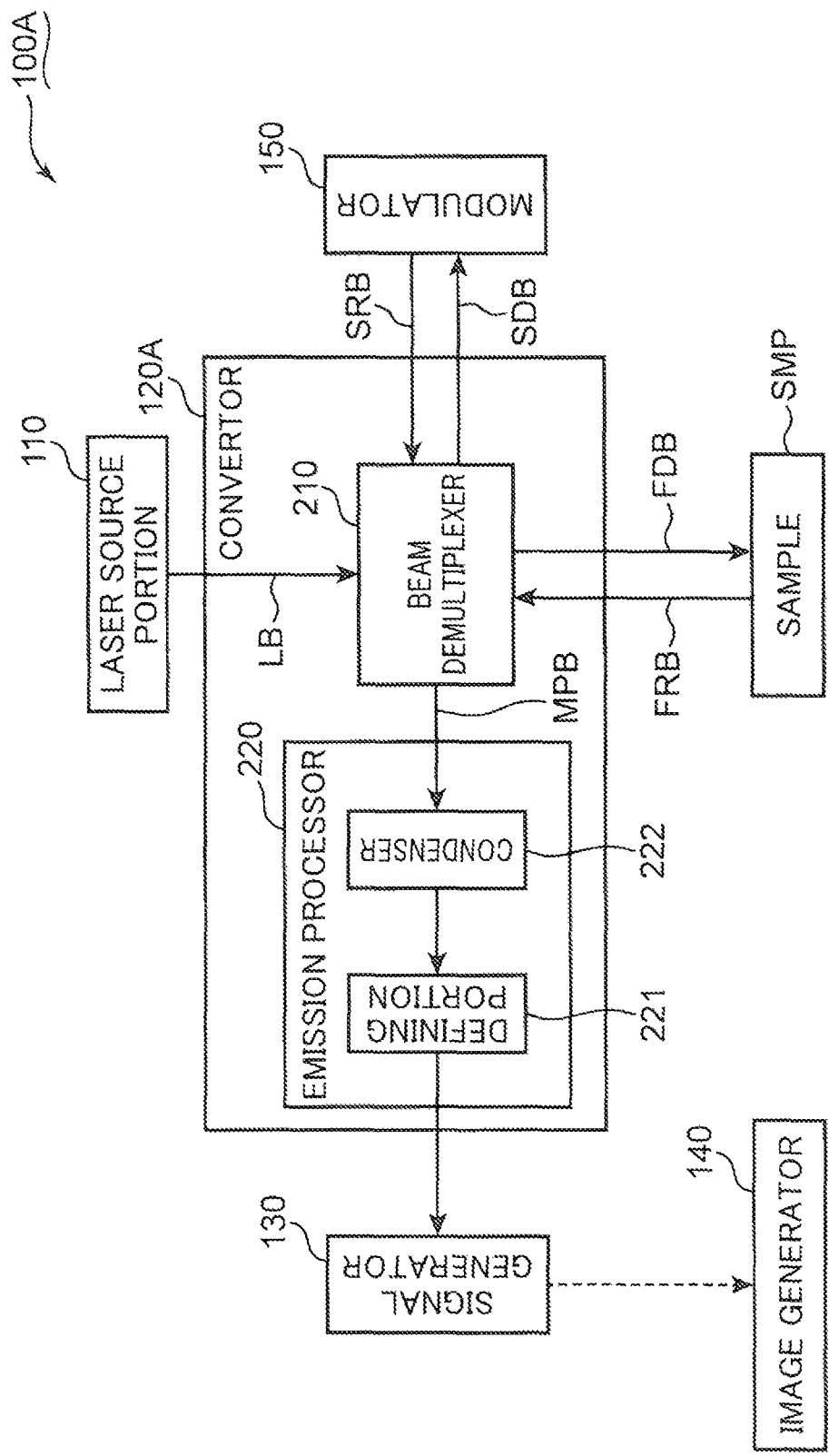
FIG. 4 is a schematic block diagram of an image generation device according to the second embodiment.

FIG. 4 is a schematic block diagram of an image generation device 100A according to the second embodiment. The image generation device 100A is described with reference to FIG. 4. Each of the solid arrows in FIG. 4 represents beam propagation. The dotted arrow in FIG. 4 represents signal transmission. Reference numerals used commonly in the first and second embodiments indicate that components designated by the common reference numerals have the same functions as the first embodiment. Therefore, the description in the first embodiment is applicable to these components.

Like the first embodiment, the image generation device 100A includes the laser source portion 110, the signal generator 130, the image generator 140 and the modulator 150. The image generation device 100A further includes a convertor 120A. The convertor 120A includes a beam demultiplexer 210 and an emission processor 220.

The laser source portion 110 emits the laser beam LB to the beam demultiplexer 210. The beam demultiplexer 210 demultiplexes the laser beam LB into the first and second demultiplexed beams FDB, SDB. The first demultiplexed beam FDB propagates toward the sample SMP. A part of the first demultiplexed beam FDB then becomes the first reflected beam FRB reflected by the sample SMP. The first reflected beam FRB propagates toward the beam demultiplexer 210. The second demultiplexed beam SDB propagates toward the modulator 150. The modulator 150 modulates a phase of the second demultiplexed beam SDB and reflects the second multiplexed beam SDB to generate the second reflected beam SRB. The second reflected beam SRB is used as a reference beam for the first reflected beam FRB. Like the first reflected beam FRB, the second reflected beam SRB also propagates toward the beam demultiplexer 210. The beam demultiplexer 210 multiplexes the first and second reflected beams FRB, SRB to generate the multiplexed beam MPB. The multiplexed beam MPB is emitted from the beam demultiplexer 210 to the emission processor 220.

The emission processor 220 includes a defining portion 221 and a condenser 222. The multiplexed beam MPB propagates from the beam demultiplexer 210 to the condenser 222. The condenser 222 then condenses the multiplexed beam MPB toward the defining portion 221.

The multiplexed beam MPB condensed by the condenser 222 includes 0th-order interfering light, and higher-order interfering light (i.e. ±n-th-order interfering light (n is a natural number)) which is higher in order than the 0th-order interfering light. The defining portion 221 defines a transmissive region which allows transmission of the multiplexed beam MPB. The transmissive region is sized to at least partially prevent transmission of the higher-order interfering light. Accordingly, a light quantity of the 0th-order interfering light passing through the transmissive region of the defining portion 221 is larger than a light quantity of the higher-order interfering light is. In the present embodiment, the first defining portion is exemplified by the defining portion 221. The first transmissive region is exemplified by the transmissive region defined by the defining portion 221.

The condenser 222 condenses the multiplexed beam MPB toward the transmissive region. Accordingly, a large part of the 0th-order interfering light passes through the transmissive region and propagates to the signal generator 130. On the other hand, the defining portion 221 prevents a large part of the higher-order interfering light from propagating to the signal generator 130. Consequently, the signal generator 130 mainly uses the 0th-order interfering light to generate the detection signal. In the present embodiment, the first condenser is exemplified by the condenser 222.

According to the present inventors, the higher-order interfering light is a main factor which reduces a resolution in the depth direction (i.e. direction along the optical path of the first demultiplexed beam FDB) of the sample SMP. The image generation device 100A uses the defining portion 221 situated between the condenser 222 and the signal generator 130 to block a major part of the higher-order interfering light. Consequently, the resolution in the depth direction is maintained at a high level.

The defining portion 221 may be an opening member provided with a minute aperture such as a pinhole or slit. Alternatively, the defining portion 221 may be an optical fiber. Yet alternatively, the defining portion 221 may be another optical element configured to prevent propagation of the higher-order interfering light but allow transmission of the 0th-order interfering light.

<Third Embodiment>

JP H2-36338 A (hereinafter referred to as Reference Document 3) discloses a detection device as other techniques, which use a high-coherence beam, the detection device detecting defects in a sample. The detection device is not intended to generate an image. Therefore, the detection device is not directly related to the techniques in the present embodiment intended to generate images. The techniques disclosed in Reference Document 3, however, are briefly described below as optical techniques using a high-coherence beam.

Like the techniques disclosed in Reference Document 2, the detection device in Reference Document 3 includes a laser source. Unlike the disclosed techniques in Reference Document 2, the detection device includes a pinhole member provided with a pinhole. As described below, the detection device in Reference Document 3, however, may not achieve a high resolution.

The detection device includes a reference mirror and a photoelectric conversion element. Unlike the disclosed techniques in Reference Document 2, the reference mirror is immobile.

The detection device condenses a laser beam toward a sample to form a focal point at a predetermined position in the sample. The detection device causes interference between a reflected beam from the reference mirror and a reflected beam from the sample to generate interfering light. The photoelectric conversion element generates an interference intensity signal which represents an interference pattern of the interfering light.

When the focal point is formed at a corresponding position of a defect in the sample, the interference between the reflected beams from the reference mirror and the sample is too weak for the photoelectric conversion element to output interference intensity. Therefore, the detection device determines that there is a defect in the sample when the focal point is formed at the predetermined position in the sample without the photoelectric conversion element outputting an interference intensity signal.

If a movable reference mirror is used on the basis of the knowledge provided by Reference Document 2, it may not be determined whether a change in the interference intensity signal results from the movement of the reference mirror or from a defect in the sample. Therefore, the technologies disclosed in Reference Document 2 are not applicable to the detection device in Reference Document 3. Since the techniques disclosed in Reference Document 2 are intended to detect a variation in interference fringe resulting from movement of the reference mirror, the techniques disclosed in Reference Document 3 are not applicable to the technologies disclosed in Reference Document 2.

As described above, the detection device includes the pinhole member. Unlike the image generation device described in the context of the second embodiment, the amplitude of the interfering light passing through the pinhole in Reference Document 3, however, is not always maximized. Unless the reference mirror is positioned so as to maximize the amplitude of the interfering light passing through the pinhole, the amplitude of the interfering light passing through the pinhole is relatively small. The maximization of the amplitude of the interfering light may not be important for defect detection in the sample, but may be a significant problem in generating a bright image.

The principles according to the second embodiment contribute to a high resolution in the depth direction under usage of the defining portion and the modulator which performs the phase modulation. As described above, the techniques disclosed in Reference Documents 2 and 3 negate usefulness of a combination of the modulator and the defining portion. As described in the context of the second embodiment, the combination of the modulator and the defining portion is advantageous over conventional techniques in terms of a high resolution in the depth direction. In addition, the present inventors have figured out that the numerical aperture NA of an objective lens also contributes to a high resolution in the depth direction.

The aforementioned techniques disclosed in Reference Document 1 use an objective lens having a low numerical aperture to condense the beam toward the sample. A reflected beam from the sample interferes with a reflected beam from the reference mirror. Accordingly, a signal used to observe the sample is amplified.

As described above, the techniques disclosed in Reference Document 1 use a low-coherence beam. In this case, a resolution in a lateral direction (direction orthogonal to the depth direction) obtained under beam condensation toward the sample is approximately half the resolution in the lateral direction obtained under usage of a high-coherence beam.

In addition, the techniques disclosed in Reference Document 1 require that an optical path length difference for phase difference) between reflected beams from the sample and the reference mirror is set to a value or no more than a coherence length (which is about 7 μm when an LED is used). When the coherence length is reduced to achieve a high resolution in the depth direction, it is required to strictly set a position of the reference mirror. This worsens time efficiency of the positional setting of the reference mirror. The strictly set position of the reference mirror may be changed by environmental factors (e.g. ambient temperature). Accordingly, the resolution is likely to decrease under the techniques disclosed in Reference Document 1.

The image generation device described in the context of the first embodiment uses a high-coherence beam to achieve a high resolution in the lateral direction. The image generation device described in the context of the second embodiment uses a combination of the condenser and the defining portion in addition to the high-coherence beam to achieve a high resolution even in the depth direction. The present inventors have figured out that a much higher resolution is achieved in the depth direction when an objective lens having an appropriate numerical aperture is used in addition to the principles of the second embodiment.

Figure 5:
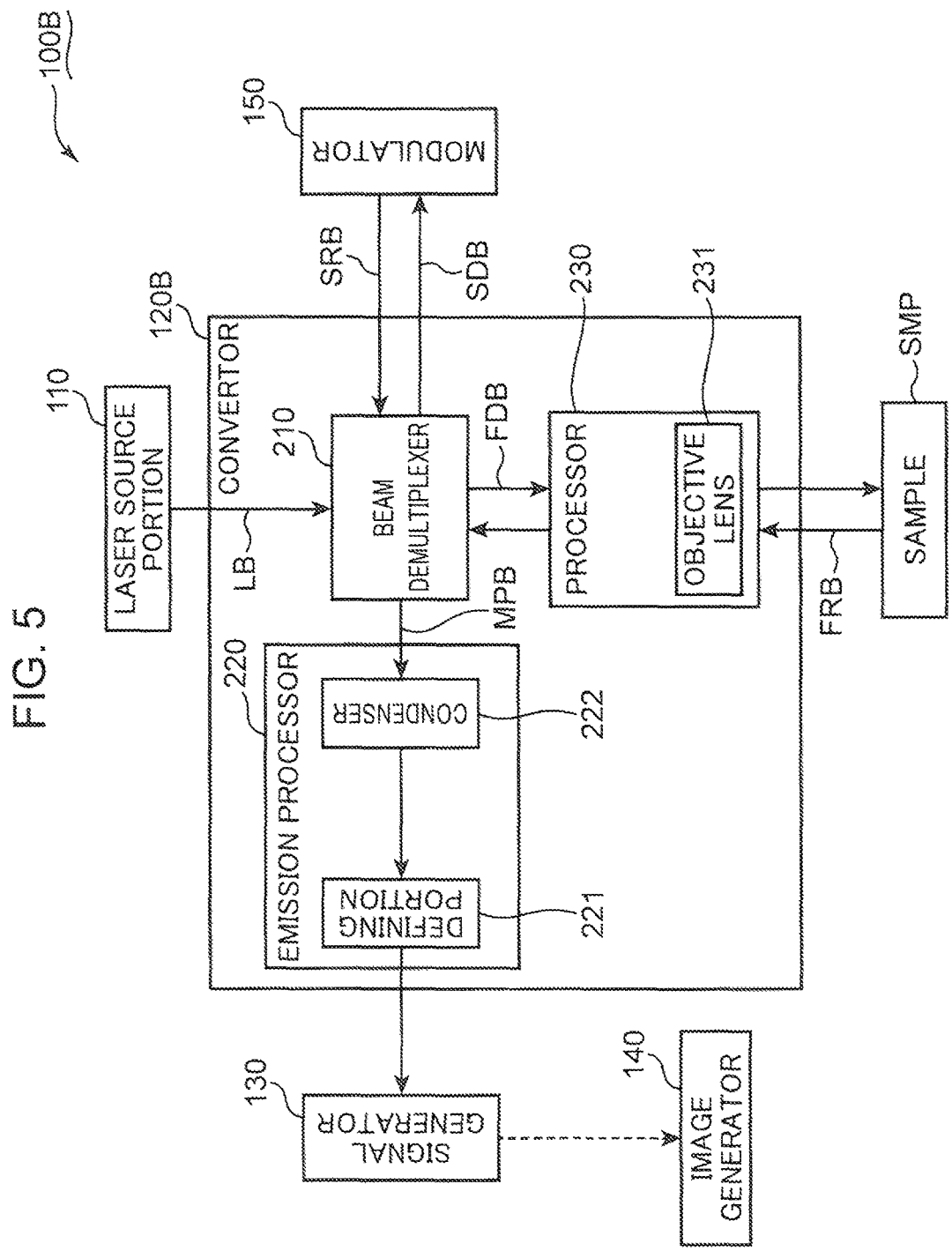
FIG. 5 is a schematic block diagram of an image generation device according to the third embodiment.

FIG. 5 is a schematic block diagram of an image generation device 100B according to the third embodiment. The image generation device 100B is described with reference to FIG. 5. Each of the solid arrows in FIG. 5 represents beam propagation. The dotted arrow in FIG. 5 represents signal transmission. Reference numerals used commonly in the second and third embodiments indicate that components designated by the common reference numerals have the same functions as the second embodiment. Therefore, the description in the second embodiment is applicable to these components.

Like the second embodiment, the image generation device 100B includes the laser source portion 110, the signal generator 130, the image generator 140 and the modulator 150. The image generation device 100B further includes a convertor 120B. Like the second embodiment, the convertor 120B includes the beam demultiplexer 210 and the emission processor 220. The convertor 120B further includes a processor 230 which optically processes the first demultiplexed beam FDB.

The processor 230 includes an objective lens 231. The objective lens 231 has a numerical aperture NA. The objective lens 231 condenses a beam toward the sample SMP having an average refractive index n. The processor 230 may have another function (such as correction of spherical aberration) in addition to the beam condensing function.

The laser source portion 110 emits the laser beam LB to the beam demultiplexer 210. The beam demultiplexer 210 demultiplexes the laser beam LB into the first and second demultiplexed beams FDB, SDB. The first demultiplexed beam FDB propagates toward the processor 230. The first demultiplexed beam FDB is condensed by the objective lens 231 to propagate toward the sample SMP. A part of the first demultiplexed beam FDB then becomes the first reflected beam FRB reflected by the sample SMP. The first reflected beam FRB propagates toward the beam demultiplexer 210. The second demultiplexed beam SDB propagates toward the modulator 150. The modulator 150 modulates a phase of the second demultiplexed beam SDB and reflects the second demultiplexed beam SDB to generate the second reflected beam SRB. The second reflected beam SRB is used as a reference beam for the first reflected beam FRB. Like the first reflected beam FRB, the second reflected beam SRB also propagates toward the beam demultiplexer 210. The beam demultiplexer 210 multiplexes the first and second reflected beams FRB, SRB to generate the multiplexed beam MPB. The multiplexed beam MPB is emitted from the beam demultiplexer 210 to the emission processor 220. The multiplexed beam MPB has a wavelength $\lambda$.

The present inventors have figured out that a resolution rd in the depth direction which is achieved by the image generation device 100B is calculated on the basis of the following expression.

$$rd = \frac{0.67\lambda}{n - \sqrt{n^2 - NA^2}} \qquad \text{[Expression 1]}$$

When a low-coherence beam is used like the techniques disclosed in Reference Document 1, the resolution in the depth direction is a coherence length t. Accordingly, a resolution higher than what is achieved by conventional techniques using a low-coherence beam is achieved in the depth direction if a relationship given by "rd<t" is satisfied, even when a laser beam having a long coherence length is used. In short, the image generation device 100B may achieve a high resolution in the depth direction when the numerical aperture NA of the objective lens 231 is set so as to satisfy the relationship given by the following inequality.

$$NA > \frac{\sqrt{1.34\,nt\lambda - 0.4489\lambda^2}}{t} \qquad \text{[Expression 2]}$$

The coherence length t of a typical LED may be calculated from the following expression.

$$t = \frac{0.441\lambda c^2}{\Delta\lambda} \qquad \text{[Expression 3]}$$

The symbol "$\lambda c$" in the aforementioned expression represents a central wavelength of the LED. The symbol "$\Delta\lambda$" represents the full-width at half-maximum of a wavelength.

When the LED has a "0.405 μm" central wavelength and a "10 nm" full-width at half-maximum, the coherence t derived from the aforementioned expression is "7.2 μm". Many LEDs emit beams each of which has a coherence length near "7.2 μm". Therefore, the numerical aperture NA for achieving a resolution higher than what is achieved by many LEDs may be given by the following inequality.

$$NA > \sqrt{0.18611 n\lambda - 0.00865934\lambda^2} \qquad \text{[Expression 4]}$$

When the average refractive index n of a living cell used as the sample SMP is "1.335", a condition of the numerical aperture NA required for achieving a resolution higher than what is achieved by a device using an LED configured to emit a beam with a "0.405 μm" wavelength is given by "NA>0.322". When the average refractive index n of the sample SMP is "1.5", the condition of the numerical aperture NA required for achieving a resolution higher than what is achieved by the device using the LED configured to emit the beam with the "0.405 μm" wavelength is given by "NA>0.334". When the aforementioned conditions about the numerical aperture NA are satisfied, the image generation device 100B may achieve a high resolution in each of the lateral and depth directions.

Unlike the techniques disclosed in Reference Document 1 described above, the image generation device 100B uses a high-coherence beam to generate a sample image. Accordingly, the optical path length difference (or phase difference) between the first and second reflected beams FRB, SRB does not have to be set to a value around 0 in the design of the image generation device 100B. When the optical path length difference is set to be shorter than the coherence length of the laser beam LB, a degree of interference (visibility) of the multiplexed beam MPB is substantially constant. Therefore, excessively high accuracy is not required for a position of the modulator 150. In addition, a positional change of the modulator 150 because of environmental factors (e.g. ambient temperature) becomes less influential to the resolution.

<Fourth Embodiment>

Various image generation devices may be designed on the basis of the design principles described in the context of the aforementioned various embodiments. An image generation device constructed on the basis of the design principles of the third embodiment is described in the present embodiment.

Figure 6:
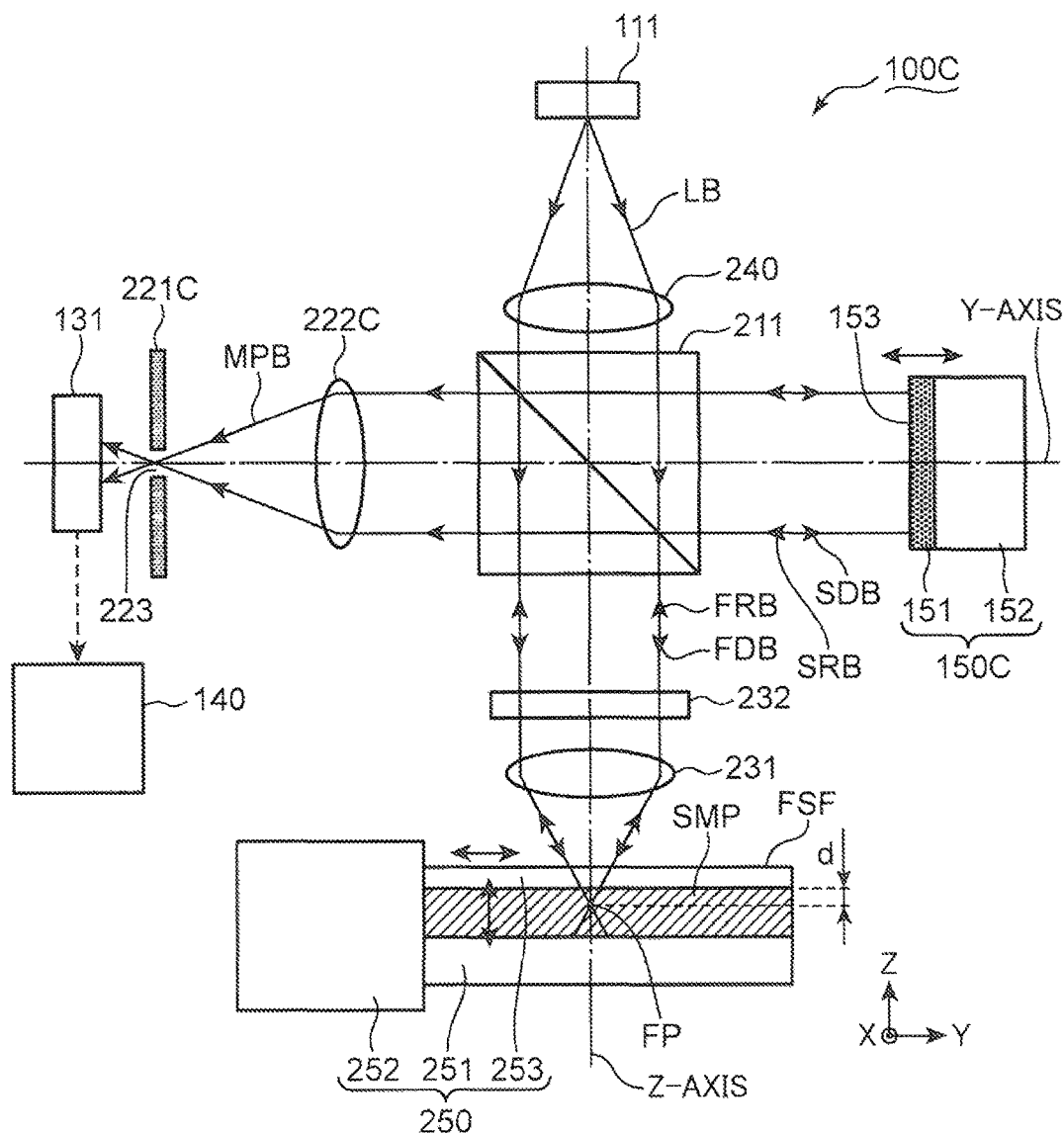
FIG. 6 is a schematic view of an image generation device according to the fourth embodiment.

FIG. 6 is a schematic view of an image generation device 100C according to the fourth embodiment. The image generation device 100C is described with reference to FIGS. 5 and 6. Each of the solid arrows in FIG. 6 represents beam propagation. The dotted arrow in FIG. 6 represents signal transmission. Reference numerals used commonly in the third and fourth embodiments indicate that components designated by the common reference numerals have the same functions as the third embodiment. Therefore, the description in the third embodiment is applicable to these components.

FIG. 6 uses dot-dash lines to show the Y-axis drawn along the optical path of each of the multiplexed beam MPB, the second demultiplexed beam SDB and/or the second reflected beam SRB, and the Z-axis drawn along the optical path of each of the laser beam LB, the first demultiplexed beam FDB and/or the first reflected beam FRB. FIG. 6 also shows XYZ coordinates including the Y-axis, the Z-axis and the X-axis orthogonal to each of the Y-axis and the Z-axis. In the following description, the term "depth direction" means a direction along the Z-axis or a direction parallel with the Z-axis. The term "lateral direction" means a direction along the Y-axis or a direction parallel with the Y-axis.

Like the third embodiment, the image generation device 100C includes the image generator 140 and the objective lens 231. The numerical aperture NA of the objective lens 231 is set to an appropriate value on the basis of the principles described in the context of the third embodiment.

For example, the numerical aperture NA may be set to "0.85". The focal distance of the objective lens 231 is set to a suitable value for a design of the image generation device 110C. For example, the focal distance of the objective lens 231 may be "2 mm".

The image generation device 100C further includes a laser source 111, a photodetector 131, a modulator 150C, a beam demultiplexing element 211, a pinhole member 221C and a detection lens 222C. The laser source 111 emits the laser beam LB. Accordingly, the laser source 111 corresponds to the laser source portion 110 shown in FIG. 5. The photodetector 131 receives the multiplexed beam MPB to generate a detection signal in correspondence to a light quantity of the multiplexed beam MPB. Accordingly, the photodetector 131 corresponds to the signal generator 130 shown in FIG. 5. The beam demultiplexing element 211 demultiplexes the laser beam LB into the first and second demultiplexed beams FDB, SDB. In addition, the beam demultiplexing element 211 multiplexes the first and second reflected beams FRB, SRB to generate the multiplexed beam MPB. Accordingly, the beam demultiplexing element 211 corresponds to the beam demultiplexer 210 shown in FIG. 5. A typical beam splitter may be used as the beam demultiplexing element 211. The pinhole member 221C defines a pinhole 223. The pinhole 223 is sized so as to prevent passage of higher-order interfering light but allow passage of the 0th-order interfering light. Accordingly, the pinhole member 221C corresponds to the defining portion 221 shown in FIG. 5. The pinhole 223 corresponds to the transmissive region of the defining portion 221. The detection lens 222C condenses the multiplexed beam MPB emitted from the beam demultiplexing element 211 toward the pinhole 223. Accordingly, the detection lens 222C corresponds to the condenser 222 shown in FIG. 5.

The modulator 150C includes a mirror 151 and a displacement mechanism 152. The mirror 151 reflects the second demultiplexed beam SDB to generate the second reflected beam SRB. The displacement mechanism 152 displaces the mirror 151 in the lateral direction to modulate a phase of the second reflected beam SRB and generate a reference beam. The modulator 150C corresponds to the modulator 150 shown in FIG. 5. In the present embodiment, the reflector is exemplified by the mirror 151. The displacement mechanism 152 may he a piezoelectric stage. Alternatively, the displacement mechanism 152 may be an electric stage.

The image generation device 100C further includes a collimator lens 240, a correction element 232 and a position adjustment mechanism 250. The collimator lens 240 is situated between the beam demultiplexing element 211 and the laser source 111. The correction element 232 corrects spherical aberration of the first demultiplexed beam FDB between the beam demultiplexing element 211 and the objective lens 231. The correction element 232 may be used as a part of the processor shown in FIG. 5. In the present embodiment, the first corrector is exemplified by the correction element 232.

The position adjustment mechanism 250 includes a stage 251, a driver 252 and a cover glass 253. The stage 251 supports the sample SMP such as a highly transparent living cell. The driver 252 displaces the stage 251 in the lateral direction (Y-axis), in the depth direction (Z-axis) and in the X-axis direction. Accordingly, a position of the sample SMP is appropriately adjusted. The cover glass 253 fixes the sample SMP on the stage 251. The position adjustment mechanism 250 may be a triaxial electric stage. A thickness of the cover glass 253 may be set appropriately for a design of the image generation device 100C. For example, the cover glass 253 may be set to "0.17 mm" in thickness.

The laser source 111 emits the laser beam LB as a divergent beam to the collimator lens 240. The collimator lens 240 changes the laser beam LB into a collimated beam. The collimated beam is then incident on the beam demultiplexing element 211.

The beam demultiplexing element 211 demultiplexes the laser beam LB propagating from the collimator lens 240 into the first and second demultiplexed beams FDB, SDB. The first demultiplexed beam FDB propagates toward the correction element 232. The second demultiplexed beam SDB propagates toward the mirror 151.

The correction element 232 corrects spherical aberration of the first demultiplexed beam FDB. The first demultiplexed beam FDB is then incident on the objective lens 231. The objective lens 231 condenses the first demultiplexed beam FDB toward the sample SMP which is fixed on the stage 251. Accordingly, a focal point FP is formed in the sample SMP. The position adjustment mechanism 250 displaces the stage 251 in the lateral direction, in the depth direction and/or in the X-axis direction to adjust a relative positional relationship between the focal point FP and the sample SMP. The sample SMP reflects a part of the first demultiplexed beam FDB to generate the first reflected beam FRB. The first reflected beam FRB sequentially passes through the objective lens 231 and the correction element 232, and then enters into the beam demultiplexing element 211. In the present embodiment, the positional adjuster is exemplified by the position adjustment mechanism 250.

The second demultiplexed beam SDB is incident on the mirror 151. Meanwhile, the displacement mechanism 152 displaces the mirror 151 in the lateral direction (in the Y-axis direction). Accordingly, the modulator 150C may cause a change in phase of the second demultiplexed beam SDB incident on the mirror 151. The mirror 151 reflects the second demultiplexed beam SDB to generate the second reflected beam SRB as a reference beam. The second reflected beam SRB is incident on the beam demultiplexing element 211.

The beam demultiplexing element 211 multiplexes the first and second reflected beams FRB, SRB to generate the multiplexed beam MPB. The multiplexed beam MPB propagates from the beam demultiplexing element 211 to the detection lens 222C. The detection lens 222C condenses the multiplexed beam MPB toward the pinhole 223. In the present embodiment, the beam demultiplexing element 211 has a beam demultiplexing function and a beam multiplexing function. A combination of an optical element dedicated to a beam demultiplexing process and another optical element dedicated to a beam multiplexing function may be used, instead of the beam demultiplexing element 211.

The pinhole member 221C prevents passage of higher-order interfering light but allows passage of 0th-order interfering light. Accordingly, the higher-order interfering light is substantially blocked by the pinhole member 221C. The multiplexed beam MPB including the 0th-order interfering light as main components passes through the pinhole 223 to be incident on the photodetector 131.

The photodetector 131 receives the multiplexed beam MPB. The photodetector 131 generates a detection signal in correspondence to a light quantity of the multiplexed beam MPB. The detection signal is output from the photodetector 131 to the image generator 140. The image generator 140 generates a sample image on the basis of the detection signal.

Figure 7:
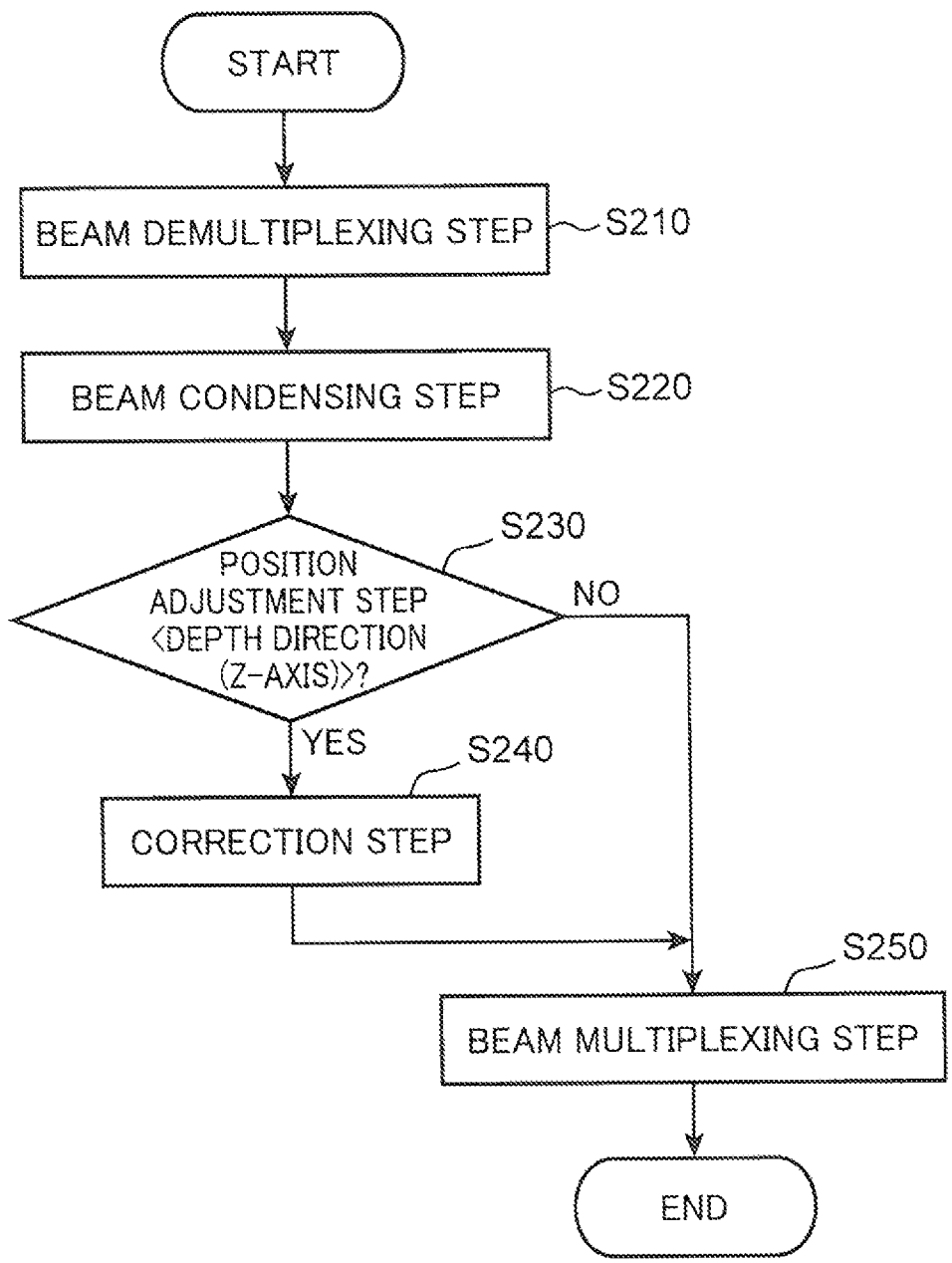
FIG. 7 is a schematic flow chart showing operation of the image generation device depicted in FIG. 6.

FIG. 7 is a schematic flow chart showing operation of the image generation device 100C in the conversion step (c.f. FIG. 3). The conversion step is described with reference to FIGS. 3, 6 and 7.

(Step S210)

After the emission step (c.f. FIG. 3), Step S210 is performed. In Step S210, the beam demultiplexing element 211 demultiplexes the laser beam LB into the first and second demultiplexed beams FDB, SDB. Step S220 is then performed.

(Step S220)

In Step S220, the objective lens 231 condenses the first demultiplexed beam FDB toward the sample SMP. Accordingly, the first demultiplexed beam FDB passes through the cover glass 253 as a convergent beam to form the focal point FP in the sample SMP. Step S230 is then performed.

(Step S230)

In Step S230, the position adjustment mechanism 250 displaces the stage 251 in the lateral direction (Y-axis direction), in the depth direction (Z-axis direction) and/or in the X-axis direction to adjust a relative positional relationship between the focal point FP and the sample SMP. Accordingly, the focal point FP is set at an intended position in the sample SMP. When the stage 251 is displaced in the depth direction, Step S240 is performed. Otherwise, Step S250 is performed.

(Step S240)

In Step S240, the correction element 232 corrects spherical aberration of the first demultiplexed beam FDB on the basis of the depth position (value represented by the symbol "d" in FIG. 6) of the focal point FP relative to the sample SMP. Step S250 is then performed.

(Step S250)

In Step S250, the sample SMP reflects a part of the first demultiplexed beam FDB generated in Step S210 to generate the first reflected beam FRB. The first reflected beam FRB is incident on the beam demultiplexing element 211. The mirror 151 reflects the second demultiplexed beam SDB generated in Step S210 to generate the second reflected beam SRB. Meanwhile, the displacement mechanism 152 displaces the mirror 151 in the lateral direction (Y-axis direction) to cause phase modulation. The beam demultiplexing element 211 multiplexes the first and second reflected beams FRB, SRB to generate the multiplexed beam MPB.

In Step S230, the position adjustment mechanism 250 displaces the stage 251 in the lateral direction (Y-axis direction), in the depth direction (Z-axis direction) and/or in the X-axis direction to adjust a relative positional relationship between the focal point FP and the sample SMP. Accordingly, the triaxial electric stage is used desirably as the position adjustment mechanism 250. Alternatively, an optical deflection element such as a galvano-mirror may be placed as the position adjustment mechanism in the optical path of the first demultiplexed beam FDB between the beam demultiplexing element 211 and the objective lens 231. In this case, the focal point FP moves with operation of the optical deflection element. Consequently, the relative positional relationship between the focal point FP and the sample SMP is adjusted without displacement of the sample SMP. Therefore, Step S230 may be time-efficiently performed.

Figure 8:
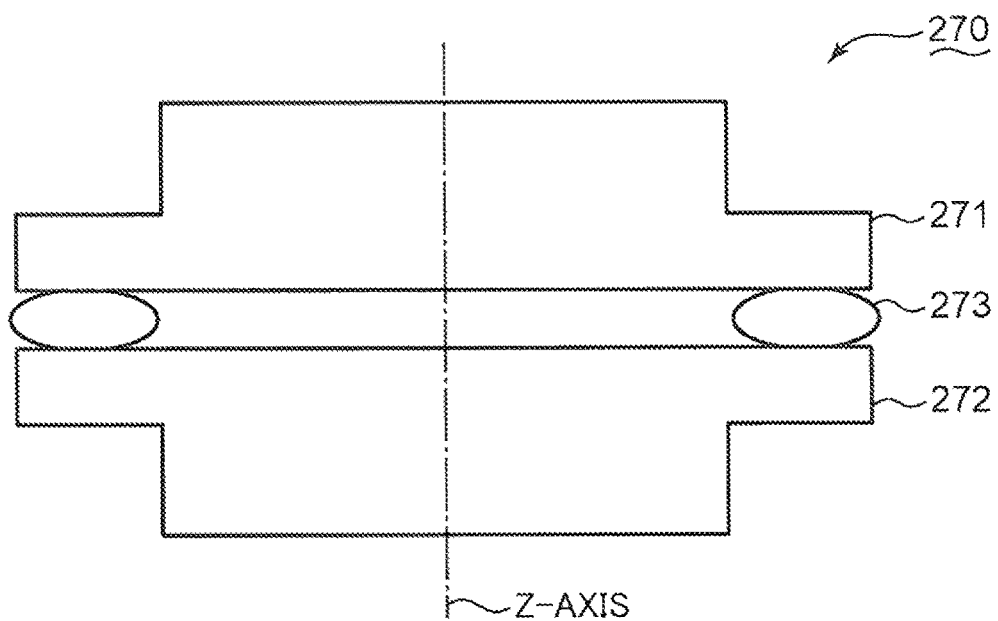
FIG. 8 is a schematic view of a beam expander exemplified as a correction element of the image generation device shown in FIG. 6.

FIG. 8 is a schematic view of a beam expander 270 exemplified as the correction element 232. The correction element 232 is described with reference to FIGS. 6 to 8. Liquid crystal elements having a variable refractive index distribution may be used as the correction element 232. Therefore, the description with reference to FIG. 8 does not limit the principles of the present embodiment.

The beam expander 270 includes a concave lens 271, a convex lens 272 and an actuator 273. The actuator 273 displaces at least one of the concave lens 271 and the convex lens 272 along the Z-axis. Accordingly, a distance between the concave lens 271 and the convex lens 272 changes to correct spherical aberration of the first demultiplexed beam FEB.

When a position of the focal point FP in the depth direction is changed in Step S230, the actuator 273 may be operated in Step S240. Accordingly, the spherical aberration is appropriately corrected on the basis of the depth position (value represented by the symbol "d" in FIG. 6) of the focal point FP. Consequently, the first demultiplexed beam FDB is excellently converged to form the focal point FP which is suitable for generating a sample image. This results in a sample image with a high resolution in the XY plane. When the focal point FP is set at a deep position (i.e. when the symbol "d" has a large value) without operation of the actuator 273, the sample image is more likely to be a blur. Accordingly, there is a decreased resolution of a resultant sample image.

An algorithm for operating the actuator 273 may be designed in light of the spherical aberration resulting from a thickness (e.g. 0.17 mm) of the cover glass 253. Alternatively, the spherical aberration resulting from a thickness of the cover glass 253 may be considered in a design of the objective lens 231.

Figure 9A:
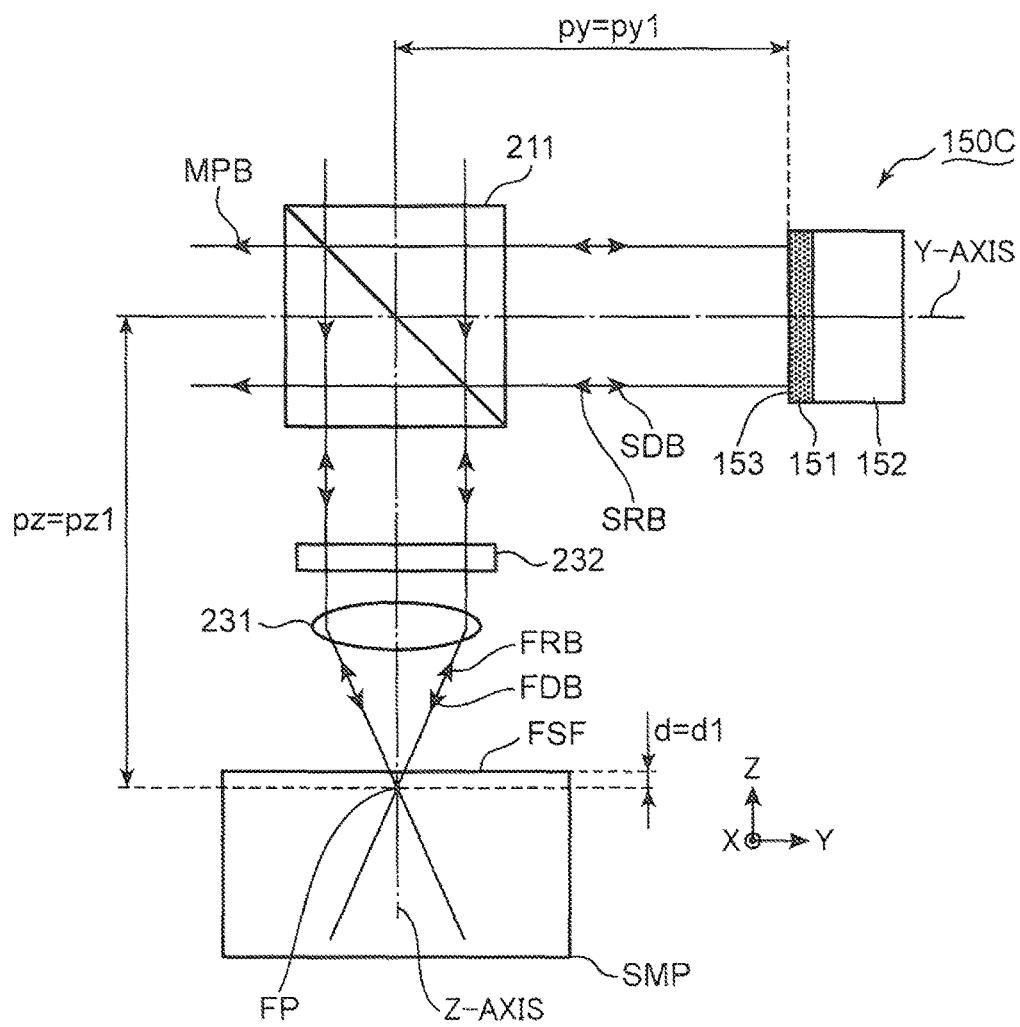
FIG. 9A is a schematic view of a modulator of the image generation device shown in FIG. 6.

FIGS. 9A and 9B are schematic views of the modulator 150C which operates in response to a depth position "d" of the focal point FP. The operation of the modulator 150C is described with reference to FIGS. 6, 9A and 9B.

In the following description, the depth position "d" of the focal point FP is defined as a distance between the focal point FP and a facing surface FSF of the sample SMP, which faces the objective lens 231. The definition about the depth position "d" is intended only to clarify the description. Therefore, the definition about the depth position "d" does not limit the principles of the present embodiment.

The focal point FP shown in FIG. 9A is present at a depth position "d1". The focal point FP shown in FIG. 9B is present at a depth position "d2". A value of the depth position "d2" is larger than a value of the depth position "d1".

In the following description, the direction in which the focal point FP moves relative to the sample SMP is referred to as "+Z direction" or "−Z direction". The term "+Z direction" indicates a direction in which the focal point FP gets closer to the facing surface FSF. The term "−Z direction" indicates a direction in which the focal point FP moves away from the facing surface FSF. The definition about the movement direction of the focal point FP is intended only to clarify the description. Therefore, the definition about the movement direction of the focal point FP does not limit the principles of the present embodiment.

The optical axis defined between the modulator 150C and the beam demultiplexing element 211 coincides with the Y-axis. The optical distance "pz" from the focal point FP to the beam demultiplexing element 211 shown in FIG. 9A has a value "pz1". The optical distance "pz" from the focal point FP to the beam demultiplexing element 211 shown in FIG. 9B has a value "pz2", The optical distance "pz2" is longer than the optical distance "pz1" is.

The modulator 150C may displace the mirror 151 along the y-axis so that the detection signal output from the photodetector 131 represents a large light quantity. In the following description, the displacement direction of the mirror 151 is referred to as "+Y direction" or "−Y direction". The term "+Y direction" indicates a direction in which the mirror 151 moves away from the beam demultiplexing element 211. The term "−Y direction" indicates a direction in which the mirror 151 gets closer to the beam demultiplexing element 211. The definition about the movement direction of the mirror 151 is intended only to clarify the description. Therefore, the definition about the movement direction of the mirror 151 does not limit the principles of the present embodiment.

When the second reflected beam SRB matches the first reflected beam FRB in phase, the photodetector 131 outputs a detection signal representing a large light quantity of the multiplexed beam MPB. In this case, the image generation device 100C may generate a bright sample image.

The mirror 151 includes a reflection surface 153 which faces the beam demultiplexing element 211. The second demultiplexed beam SDB is reflected by the reflection surface 153 to become the second reflected beam SRB. The optical distance "py" from the reflection surface 153 to the beam demultiplexing element 211 shown in FIG. 9A has a value "py1". The optical distance "py" from the reflection surface 153 to the beam demultiplexing element 211 shown in FIG. 9B has a value "py2". The optical distance "py2" is longer than the optical distance "py1" is.

A phase quantity may be defined by the following expression. The definition about the phase quantity does not limit the principles of the present embodiment.

Phase Quantity=Refractive Index×Wave Number× Optical Path Length [Expression 5]

As shown in FIG. 9A, the modulator 150C adjusts a position of the mirror 151 so that the phase quantity in correspondence to the optical distance "pz" is equal to the phase quantity in correspondence to the optical distance "py" when the depth position "d" of the focal point FP is set to the value "d1". Accordingly, the second reflected beam SRB matches the first reflected beam FRB in phase at the beam demultiplexing element 211.

In many cases, a refractive index (e.g. "1.335") of the sample SMP such as a living cell is larger than a refractive index of air. In this case, a focal distance of the objective lens 231 is elongated by the refractive index of the sample SMP. When the focal point FP is moved in the "−Z direction", the optical distance "pz" increases from the value "pz1" to the value "pz2". Meanwhile, the modulator 150C displaces the mirror 151 by a distance "Δp" in the "+Y direction" to set the optical distance "py" to the value "py2". When the optical distance "py" is set to the value "py2", the second reflected beam SRB matches the first reflected beam FRB in phase at the beam demultiplexing element 211. Accordingly, the photodetector 131 outputs the detection signal representing a large light quantity of the multiplexed beam MPB.

The principles of the present embodiment allow an increase in power (light quantity) of the multiplexed beam MPB under the displacement of the mirror 151 instead of an increase in power of the laser source 111. Accordingly, the multiplexed beam MPB having large power (light quantity) is generated by the phase match in the multiplex of the first and second reflected beams FRB, SRB even when there are a small change in refractive index of the sample SMP and small power (light quantity) of the first reflected beam FRB. The principles of the present embodiment do not require excessively large power of the laser source 111. Consequently, there is little optical and/or thermal damage to the living cell used as the sample SMP.

Figure 10:
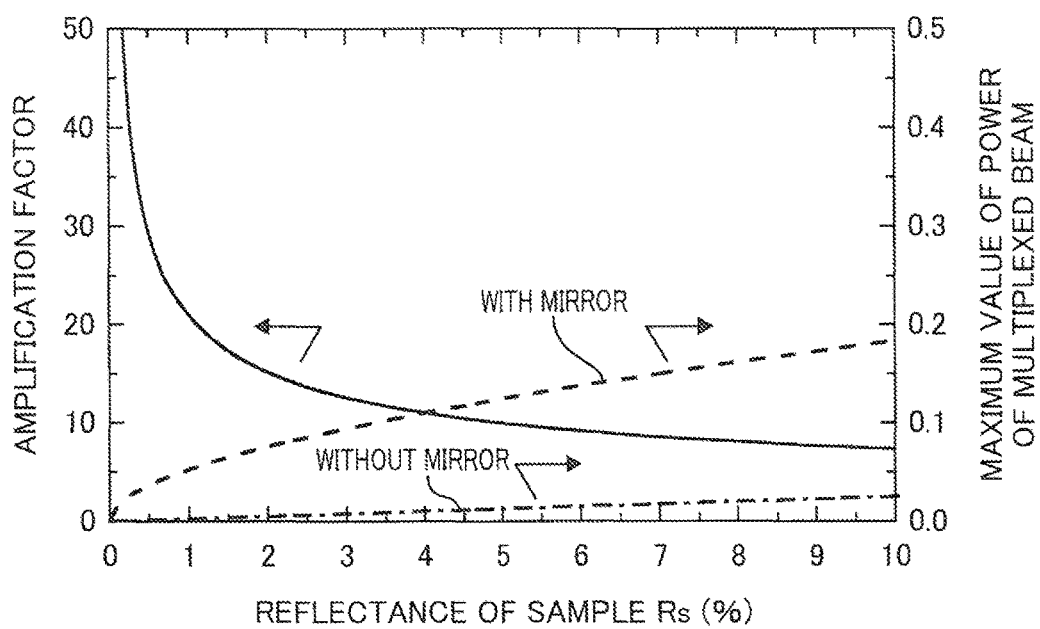
FIG. 10 is a graph showing an exemplary relationship among reflectance of a sample, a maximum value of power of a multiplexed beam and an amplification factor of a maximum power of a multiplexed beam obtained in the presence of a mirror against a maximum power of a multiplexed beam obtained in the absence of the minor.

FIG. 10 is a graph showing an exemplary relationship among reflectance Rs (%) of the sample SMP, a maximum value of power of the multiplexed beam MPB and an amplification factor of maximum power of the multiplexed beans MPB obtained in the presence of the mirror 151 against maximum power of the multiplexed beam MPB obtained in the absence of the mirror 151. An effect obtained from the mirror 151 is described with reference to FIGS. 6 and 10. Data about the amplification factor shown in FIG. 10 is applicable to power (light quantity) of the multiplexed beam MPB passing through the pinhole 223 and to the detection signal output from the photodetector 131.

The data shown in FIG. 10 was obtained under the following conditions. For normalization, the value "1" is used as power of the laser beam LB from the laser source 111. The branch ratio of the beam demultiplexing element 211 was set to the value "0.5". Reflectance of the mirror 151 was set to the value "1".

A relationship among power "$I_P$" of the multiplexed beam MPB, power "$I_R$" of the first reflected beam FRB and power "$I_M$" of the second reflected beam SRB under a phase match between the first and second reflected beams FRB, SRB is shown below.

$$I_P = 0.5\{I_R + I_M + 2\sqrt{I_R \times I_M}\}$$ [Expression 6]

When a value of the reflectance "Rs" of the sample SMP is "0.01(=1%)", the power "$I_R$" of the first reflected beam FRB has a value "0.005". The power "$I_M$" of the second reflected beam SRB has a value "0.5". Meanwhile, the power "$I_P$" of the multiplexed beam MPB has a value "0.30".

In the absence of the sample SMP, the power "$I_R$" of the first reflected beam FRB is regarded as "0". Likewise, the power "$I_R$" of the first reflected beam FRB is regarded as "0" when the reflectance of the sample SMP is "0". Meanwhile, the power "$I_P$" of the multiplexed beam MPB has a value "0.25".

Figure 11:
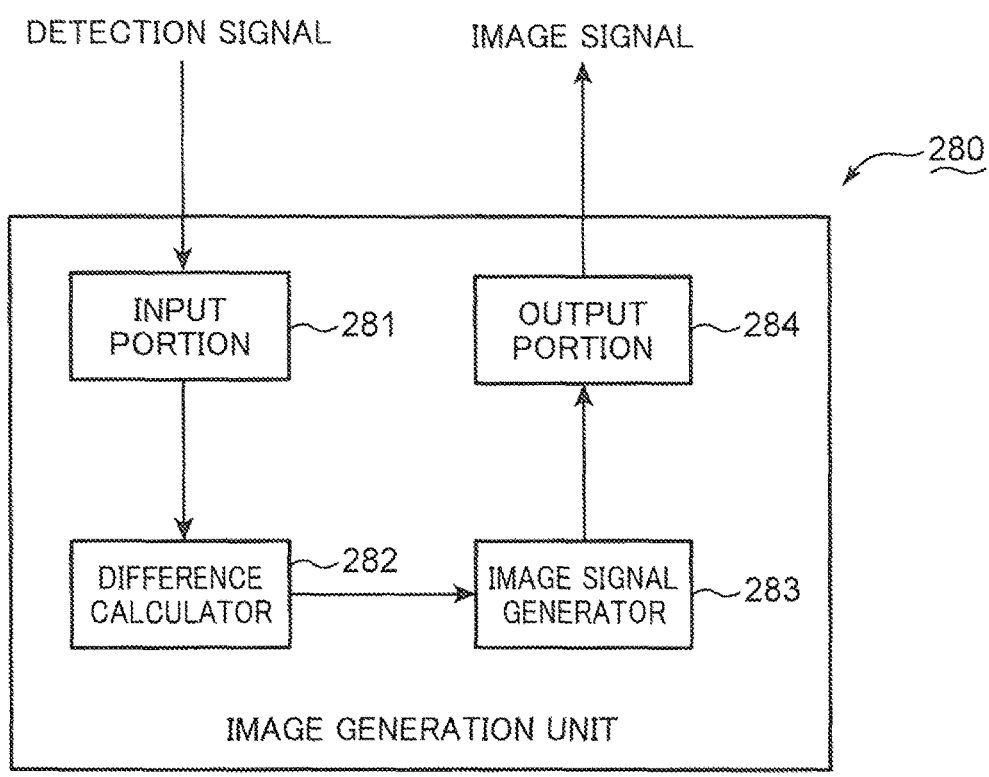
FIG. 11 is a schematic block diagram of an image generation unit exemplified as an image generator of the image generation device shown in FIG. 6.

FIG. 11 is a schematic block diagram of an image generation unit 280 exemplified as the image generator 140. The image generation unit 280 is described with reference to FIGS. 6, 10 and 11.

The image generation unit 280 includes an input portion 281, a difference calculator 282, an image signal generator 283 and an output portion 284. The detection signal is input to the input portion 281. For example, the detection signal may show that a value of the power "$I_P$" of the multiplexed beam MPB is "0.30" under the conditions described with reference to FIG. 10 (Power of Laser Beam LB: 1, Branch Ratio of Demultiplexing Element 211: 0.5, Reflectance of Mirror 151: 1, Reflectance "Rs" of Sample SMP: 1%). Data about the power "$I_P$" of the multiplexed beam MPB is transmitted from the input portion 281 to the difference calculator 282. The difference calculator 282 may preliminarily store data about the power "$I_P$" of the multiplexed beam MPB in the absence of the sample SMP or the power "$I_P$" of the multiplexed beam MPB when the reflectance of the sample SMP is "0". The difference calculator 282 subtracts the preliminarily stored data from the data from the input portion 281 to generate difference data. If the calculated value in the description with reference to FIG. 10 is used, the difference data shows the value "0.05(=0.30−0.25)".

The difference data is output from the difference calculator 282 to the image signal generator 283. The image signal generator 283 generates an image signal representing a sample image on the basis of the difference data. The image signal may be output from the output portion 284 to an external device (not shown) such as a display device configured to display an image. The difference calculation by the difference calculator 282 contributes to prevention of a misadjusted black level. Consequently, the resultant sample image is excellent in contrast.

Figure 12:
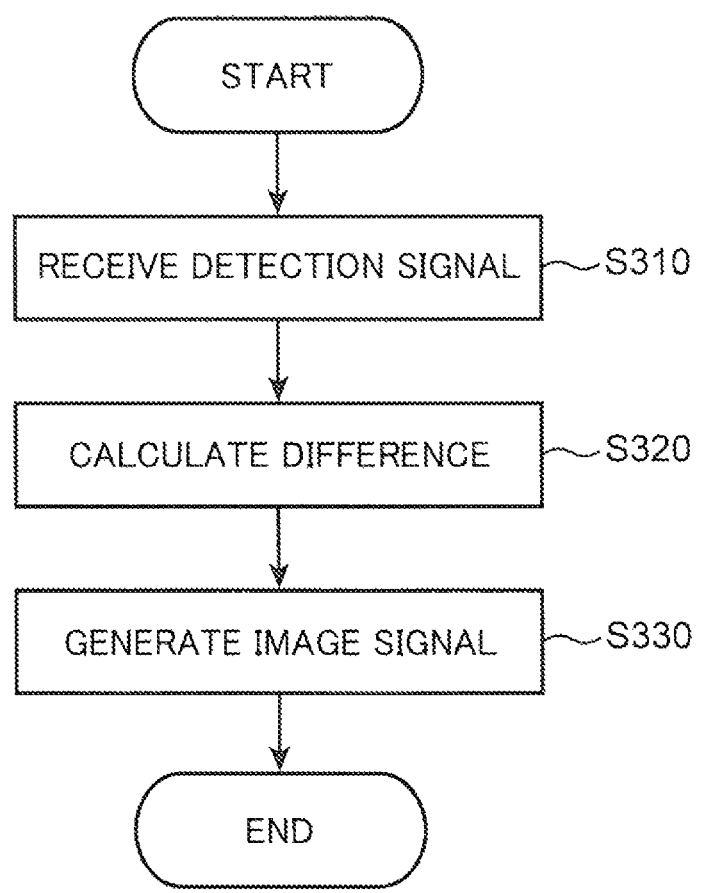
FIG. 12 is a schematic flow chart showing operation of the image generation unit depicted in FIG. 11.

FIG. 12 is a schematic flow chart showing operation of the image generation unit 280 in the image generation step (Step S140). The operation of the image generation unit 280 is described with reference to FIGS. 3, 6 and 10 to 12.
(Step S310)

After the signal generation step (Step S130) described with reference to FIG. 3, Step S310 is performed. In Step S310, the input portion 281 receives a detection signal. The detection signal is output from the input portion 281 to the difference calculator 282. Step S320 is then performed.
(Step S320)

In Step S320, the difference calculator 282 subtracts data obtained in the absence of the sample SMP (or under the condition that the reflectance of the sample SMP is "0") from the data represented by the detection signal output under the condition that the sample SMP is present to generate the difference data. The difference data is output from the difference calculator 282 to the image signal generator 283. Step S330 is then performed.
(Step S330)

In Step S330, the image signal generator 283 generates an image signal representing a sample image in response to the difference data. The image signal is output to an external device through the output portion 284. The external device displays a sample image on the basis of the image signal.

In the absence of the mirror 151, the power "$I_M$" of the second reflected beam SRB has the value "0". In this case (Power of Laser Beam LB: 1, Branch Ratio of Demultiplexing Element 211: 0.5, Reflectance of Mirror 151: 0, Reflectance "Rs" of Sample SMP: 1%), the power "$I_P$" of the multiplexed beam MPB incident on the detection lens 222C is "0.0025(=0.5×$I_R$=0.5×0.005)". Accordingly, the power "$I_P$" of the multiplexed beam MPB obtained in the presence of the mirror 151 is present is 20 times as large as the power "$I_P$" of the multiplexed beam MPB obtained in the absence of the mirror 151.

The amplification factor shown in FIG. 10 may be defined by the following expression.

$$\text{Amplification Factor} = 2\sqrt{\frac{I_M}{I_R}}$$ [Expression 7]

As obvious from the aforementioned expression and FIG. 10, the amplification factor has a large value when the reflectance of the sample SMP is low. Therefore, the principles of the present embodiment are suitable for observation of the sample SMP such as a living cell having low reflectance.

The position adjustment mechanism 250 successively changes a position of the focal point FP so that an intended region is scanned by the focal point FP. Whenever the focal point FP is set in the intended region, the image generation unit 280 performs the process shown in FIG. 12. Accordingly, a sample image representing the sample SMP in the intended region is generated. The sample image may be a two-dimensional image. Alternatively, the sample image may be a three-dimensional image.

Figure 13:
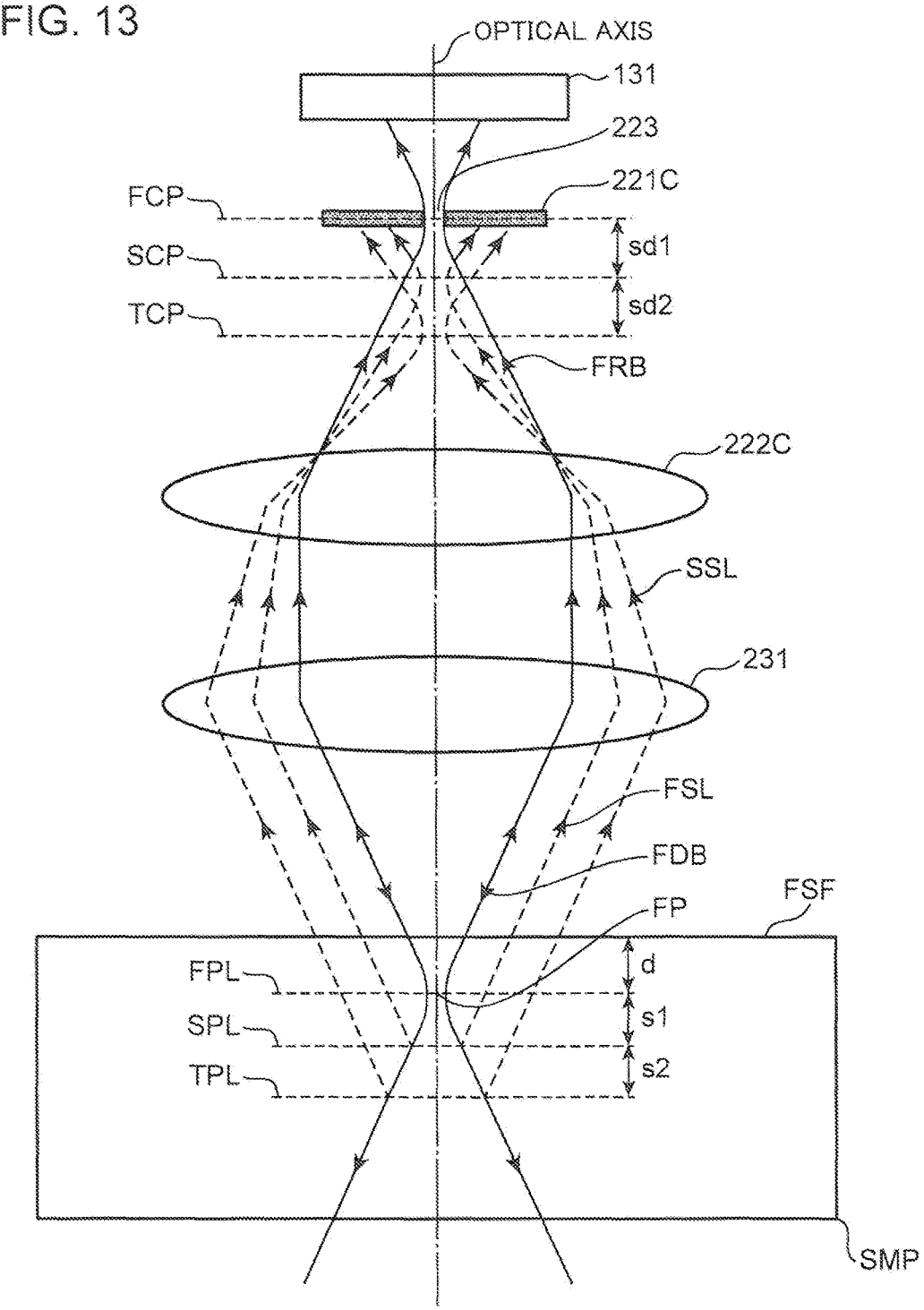
FIG. 13 is a development view schematically showing an optical path from a sample to a photodetector of the image generation device depicted in FIG. 6.

FIG. 13 is a development diagram schematically showing an optical path from the sample SMP to the photodetector 131. Stray light removal performed by the pinhole member 221C is described with reference to FIGS. 6 to 13.

In FIG. 13, the first demultiplexed beam FDB is drawn as the solid lines. The objective lens 231 forms the focal point FP in a first plane FPL drawn as the dotted line at the depth position "d". The detection lens 222C condenses the first reflected beam FRB to form a focal point at the pinhole 223. FIG. 13 shows a first corresponding plane FCP passing through the focal point formed at the pinhole 223 and orthogonal to the optical axis defined by the detection lens 222C and the pinhole member 221C.

FIG. 13 shows a second plane SPL and a third plane TPL. The second plane SPL is away from the first plane FPL by a distance "s1" in the "−Z-axis direction". The third plane TPL is away from the second plane SPL by a distance "s2" in the "−Z-axis direction".

FIG. 13 shows an optical component (hereinafter referred to as "first stray light FSL") generated from the second plane SPL. FIG. 13 shows a second corresponding plane SCP drawn between the pinhole member 221C and the detection lens 222C. The second corresponding plane SCP is away from the first corresponding plane FCP by the distance "sd1". The detection lens 222C forms a focal point of the first stray light FSL in the second corresponding plane SCP.

FIG. 13 shows an optical component (hereinafter referred to as "second stray light SSL") generated from the third plane TPL. FIG. 13 shows a third corresponding plane TCP drawn between the second corresponding plane SCP and the detection lens 222C. The third corresponding plane TCP is away from the second corresponding plane SCP by a distance "sd2". The detection lens 222C forms a focal point of the second stray light SSL in the third corresponding plane TCP.

The first and second stray lights FSL, SSL are unnecessary for obtaining an image of the sample SMP on the first plane FPL. As obvious from FIG. 13, the detection lens 222C sets a focal point of the reflected beam at a position away from the pinhole 223 when a generation position of the reflected beam is significantly away from the first plane FPL. Consequently, the reflected beam which is generated at the position away from the first plane FPL is less likely to pass through the pinhole 223. Accordingly, there is an increased resolution in the depth direction.

The focal distance of the detection lens 222C may be set, for example, to 33 mm. Meanwhile, the Airy disk diameter of the first reflected beam FRB in the first corresponding plane FCP may be 9.6 μm. The pinhole 223 is appropriately sized in light of the Airy disk diameter of the first reflected beam FRB in the first corresponding plane FCP. The first stray light FSL is defocused in the first corresponding plane FCP to have a condensed beam spot size larger than the first reflected beam FRB has. Consequently, the first reflected beam FRB may pass through the pinholes 223 whereas a large part of the first stray light FSL is prevented from passing through the pinhole 223 by the pinhole member 221C. The second stray light SSL is further defocused in the first corresponding plane FCP to have a condensed beam spot size much larger than the first stray light FSL has. Accordingly, a quantity of the second stray light SSL which passes through the pinhole 223 is smaller than a quantity of the first stray light FSL.

The pinhole member 221C improves the optical resolution in the lateral direction (in the XY plane). An improvement in the optical resolution in the lateral direction depends on a size of the pinhole 223. When the pinhole 223 is appropriately sized, there is an "approximately $2^{0.5}$-fold" increase in the resolution.

Usage of the pinhole member 221C is not essential. When the photodetector 131 has a photo-receiver (not shown), which is substantially as large as the pinhole 223, and when the detection lens 222C forms a focal point on the beam receiving portion, the same resolution as what is achieved by the image generation device 100C shown in FIG. 6 may be achieved. An optical fiber may be used instead of the pinhole member 221C. A slit member formed with a slit may be used instead of the pinhole member 221C. When the slit member is used, there may be improved quality of a signal in a one-dimensional direction.

The size of the pinhole 223 depends on the Airy disk diameter of the multiplexed beam MPB condensed by the detection lens 222C. For example, the pinhole 223 may be sized to be no less than 0.8 times and no more than 5 times as large as the Airy disk diameter. Accordingly, the resolution of the sample SMP in the depth direction (±Z-axis direction) reaches one-tenth of several micrometers to several micrometers.

An excessively small pinhole results in an excessive reduction in quantity of a beam which passes through the pinhole. Accordingly, the pinhole may be sized in consideration of beam passage quantity. Since a change in ambient temperature may cause a departure of an optical condensation position of the detection lens 222C from the center position of the pinhole, the pinhole may be sized in consideration of factors such as the ambient temperature.

An excessively large pinhole results in an increase in light quantity of the stray beam which is needlessly detected by the photodetector 131. This causes a reduction in resolution of a resultant sample image. Accordingly, the pinhole may he sized in consideration of resolution of the resultant sample image.

Figure 14A:
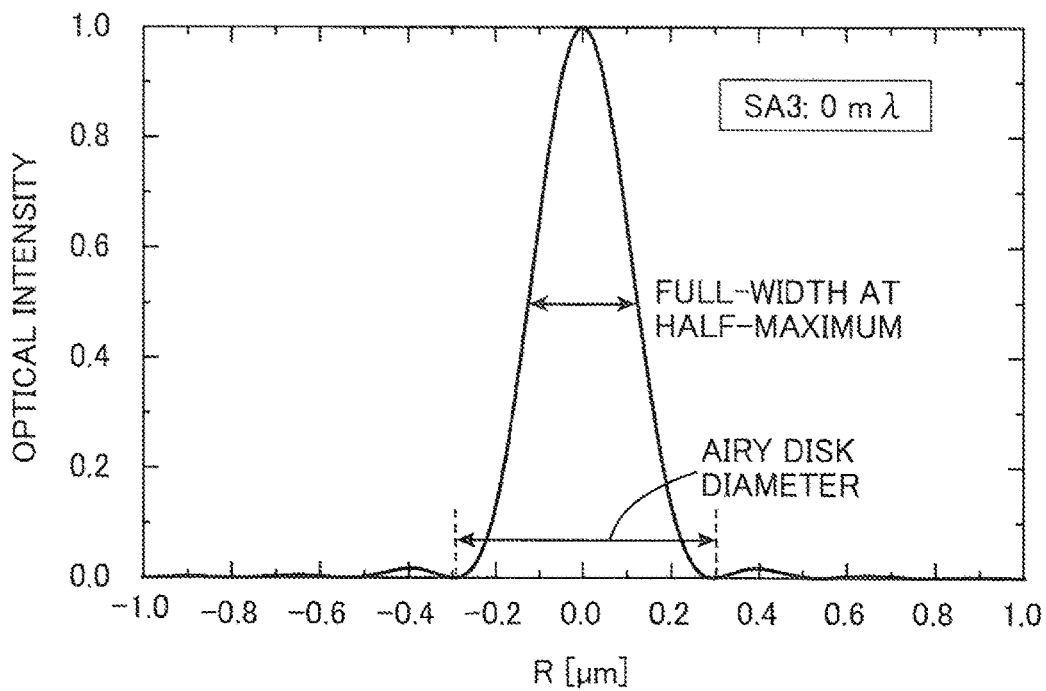
FIG. 14A is a schematic graph showing an optical intensity distribution around a condensed beam spot.
Figure 14B:
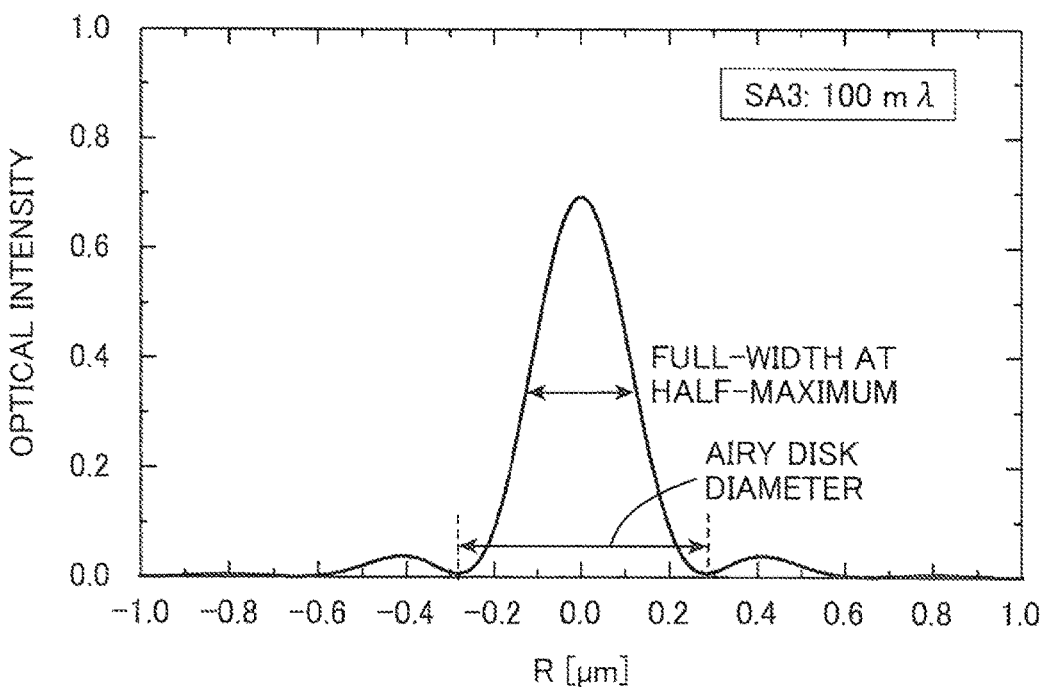
FIG. 14B is a schematic graph showing an optical intensity distribution around the condensed beam spot.
Figure 14C:
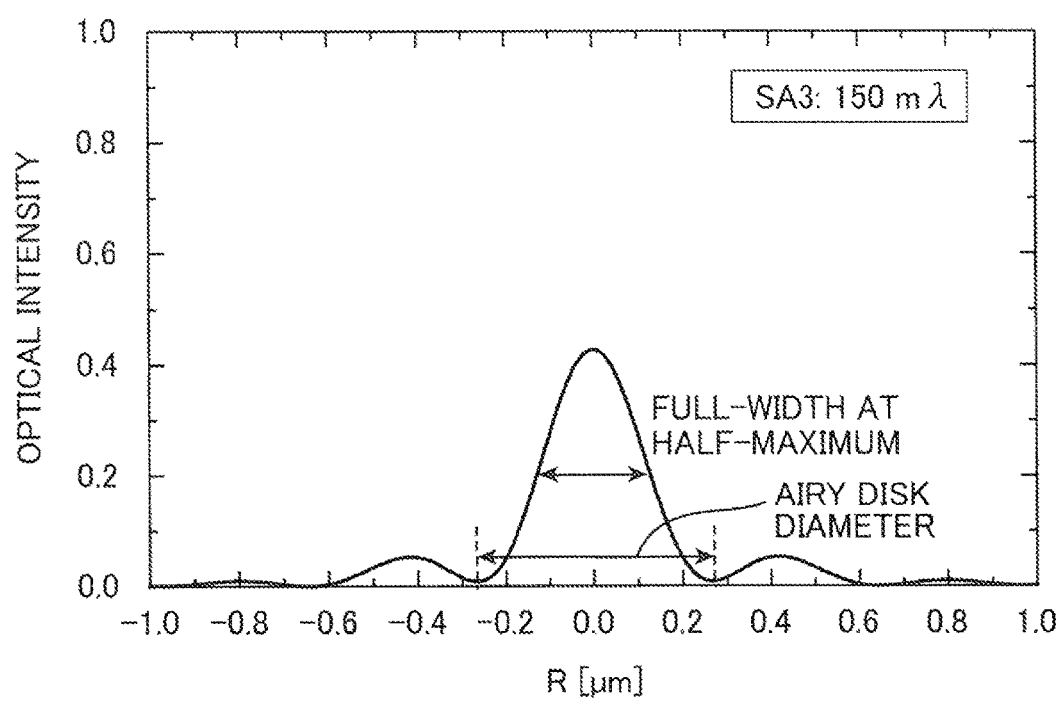
FIG. 14C is a schematic graph showing an optical intensity distribution around the condensed beam spot.

FIGS. 14A to 14C are schematic graphs each of which shows an optical intensity distribution around a condensed beam spot. A change in the optical intensity distribution resulting from spherical aberration is described with reference to FIGS. 6 and 14A to 14C.

FIG. 14A shows a distribution of optical intensity in the absence of optical aberration. A relationship among a full-width at half-maximum "2w". a numerical aperture "NA" of the objective lens 231 and a wavelength "λ" may be defined by the following expression.

$$2w = \frac{1.03\lambda}{2NA} \qquad \text{[Expression 8]}$$

FIG. 14B shows a distribution of optical intensity obtained with third-order spherical aberration of 100 mλ (the diffraction limit is no more than 70 mλ). FIG. 14C shows a distribution of optical intensity obtained with third-order spherical aberration of 150 mλ (the diffraction limit is no more than 70 mλ).

With reference to FIGS. 14A to 14C, the increase in spherical aberration results in a reduction in a maximum value of the optical intensity at a condensed beam spot. The full-width at half-maximum and the Airy disk diameter, however, are substantially consistent even when there is an increase in spherical aberration. The increase in spherical aberration results in an increase in side robe. From these facts, it may be expected that spherical aberration components reducing coherency exists in side robe portions.

According to the present inventors, spherical aberration components of orders higher than the third order are also present outside a region defined by the Airy disk diameter (e.g. in side robe regions). Spherical aberration of several hundreds of milli-lambda may actually be present. When the pinhole 223 is sized to be no more than the Airy disk diameter (diametrical dimension), the optical components in the side robe regions may be removed appropriately. Since the spherical aberration components are removed, the coherency of the multiplexed beam MPB improves.

The Airy disk diameter may be defined by the following expression.

$$\text{Airy Disk Diameter} = \frac{2.44\lambda}{2NA} \qquad \text{[Expression 9]}$$

When the objective lens 231 has a focal distance "f" and when the detection lens 222C has a focal distance "f1", the optical magnification of the image generation device 100C may be defined by the following expression.

$$\text{Optical Magnification} = \frac{f1}{f} \qquad \text{[Expression 10]}$$

The Airy disk diameter at the focal point generated at the pinhole 223 by the detection lens 222C may be defined by the following expression.

$$\text{Airy Disk Diameter} = \frac{2.44\lambda}{2NA} \times \frac{f1}{f} \qquad \text{[Expression 11]}$$

When the diameter "d" of the pinhole 223 satisfies the relationship shown by the following inequality, the aberration components including the spherical aberration may be removed appropriately. Accordingly, the multiplexed beam MPB having excellent coherency may be obtained.

$$d \leq \frac{2.44\lambda}{2NA} \times \frac{f1}{f} \qquad \text{[Expression 12]}$$

The correction element 232 is used to correct the spherical aberration. The aberration correcting function of the correction element 232, however, may be insufficient when the sample SMP has a non-uniform refractive index distribution or when there is a variety of optical aberration because of wavelength dispersion of the laser beam LB. As described above, the pinhole member 221C may appropriately remove even spherical aberration which is less likely to be corrected by the correction element 232.

Figure 15A:
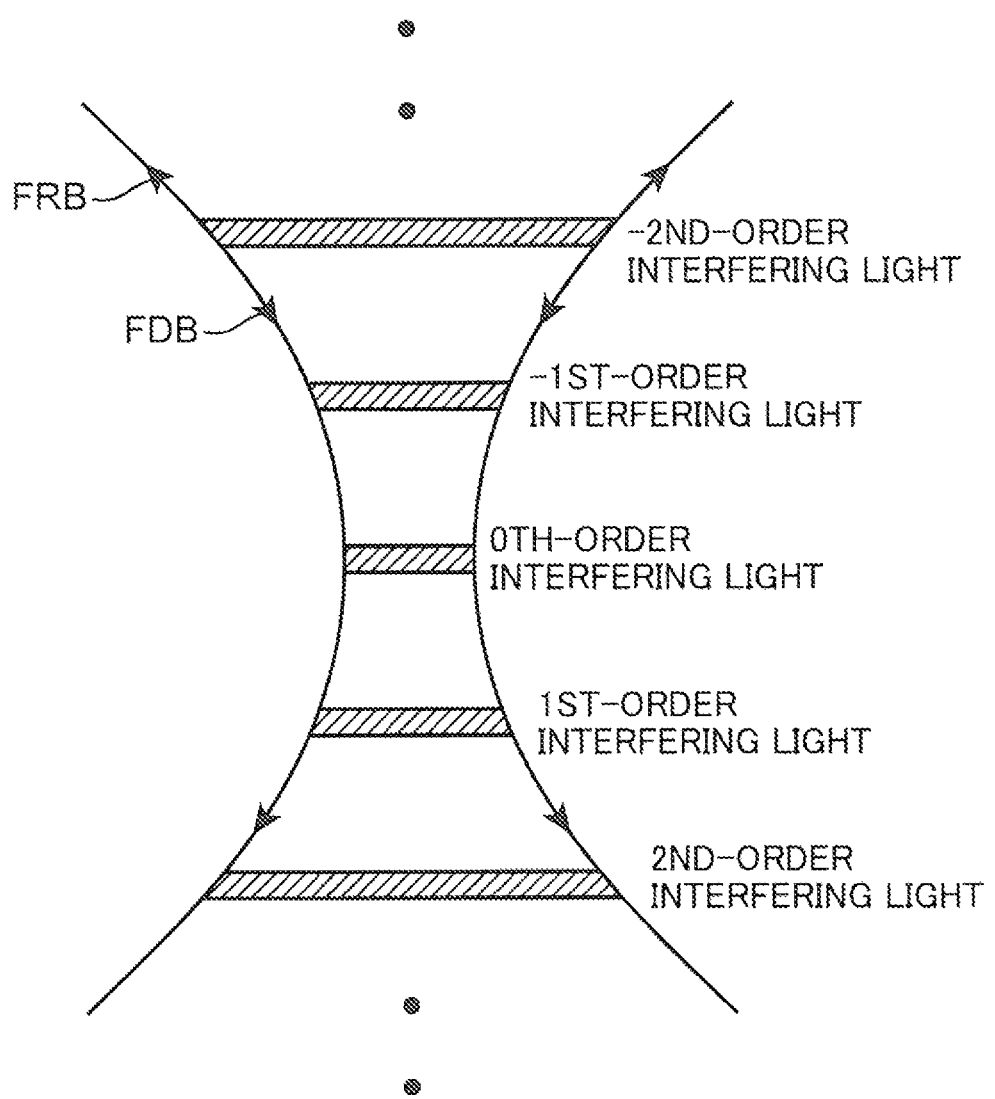
FIG. 15A is a schematic view of a beam condensed toward the sample by an objective lens having a high numerical aperture.
Figure 15B:
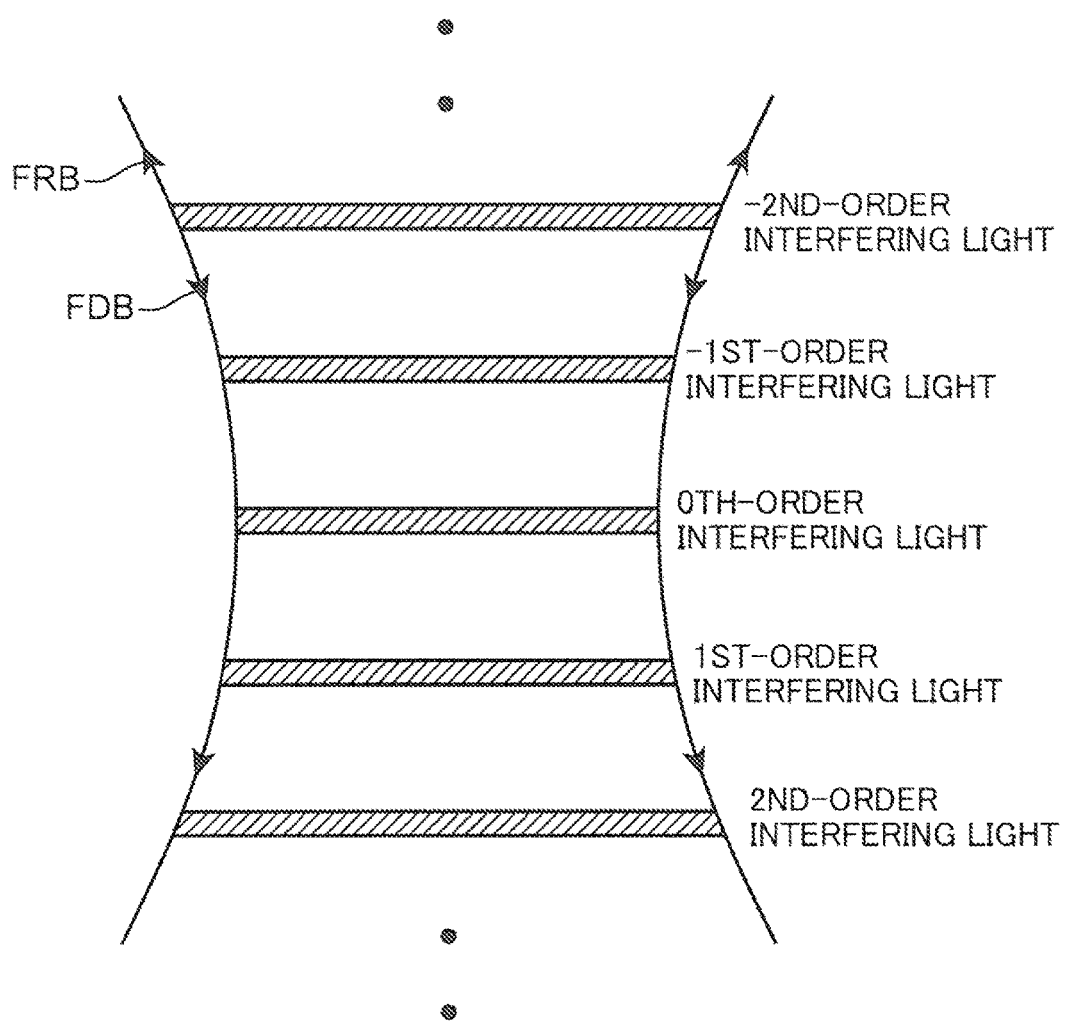
FIG. 15B is a schematic view of a beam condensed toward the sample by an objective lens having a low numerical aperture.

FIG. 15A is a schematic view of a beam condensed toward the sample SMP by the objective lens 231 having a high numerical aperture NA. FIG. 15B is a schematic view of another beam condensed toward the sample SMP by the objective lens 231 having a low numerical aperture NA. A suitable beam type for the principles of the present embodiment is described with reference to FIGS. 6, 15A and 15B.

A light source of an image generation device constructed in accordance with the principles of the present embodiment preferably emits a beam having high spatial coherence and low temporal coherence. When the spatial coherence is high as shown in FIG. 15A, the first demultiplexed beam FDB is converged to a size near the diffraction limit. Accordingly, there is an increase in optical resolution in the XY plane.

When a diameter of the pinhole 223 is set to an appropriate value, a stray beam is removed. Accordingly, the resolution in the XY plane is further improved.

When the spatial coherence is high, the definition of the full-width at half-maximum in "Expression 8" is applicable. Accordingly, it is preferable that the objective lens 231 has a large "NA" and a short-wavelength beam (e.g. blue beam) is used. The image generation device 100C shown in FIG. 6 emits the laser beam LB. The laser beam LB has high spatial coherence so that a high resolution is obtained in the XY plane.

The laser beam LB also has high temporal coherence. As obvious from the positional relationship between 0th-order interfering light around the condensed beam spot on the sample SMP and higher-order interfering lights of orders (±1st order, ±2nd order, ±3rd order, . . . ) higher than the 0-th order, higher-order interfering light components are contained in the multiplexed beam MPB as components of the first reflected beam FRB when the numerical aperture NA of the objective lens 231 is small. This degrades quality of signals output from the photodetector 131. In short, there is a decrease in optical resolution in the Z-axis direction. In this case, the temporal coherence may be reduced by techniques such as high-frequency current superimposition. Since the coherence length is reduced, there is little higher-order interfering light. Accordingly, quality of the signal is less likely to be degraded.

As shown in FIG. 15A, higher-order interfering light has a large diameter when the numerical aperture NA of the objective lens 231 is large. Therefore, the pinhole member 221C may significantly reduce the higher-order interfering light. In short, a combination of the objective lens 231 having a high numerical aperture NA and the pinhole member 221C appropriately makes the higher-order interfering lights less influential and improves a resolution in the depth direction of the sample SMP.

The beam emitted from an incoherent light source such as an LED has low spatial coherence. The incoherent beam is not significantly converged to form the focal point FP in the sample SMP (i.e. the focal point FP is enlarged to a size twice as large as the diffraction limit). The pinhole member 221C removes stray light to achieve stop effects. A beam emitted from the incoherent light source has low temporal coherence so that there is little higher-order interfering light in the multiplexed beam MPB. Accordingly, there is an increase in resolution in the depth direction of the sample SMP.

A superluminescent diode has coherence characteristics which are intermediate between a laser and an LED. Consequently, the resolutions in the X-, Y- and Z-directions are well balanced. However, since a device for emitting a short-wavelength beam (blue beam) has not been practical, the spot size increases because of a long wavelength even if the beam from the superluminescent diode is converged to a size near the diffraction limit. Therefore, the usage of the superluminescent diode may not be appropriate in terms of the resolution in the XY plane.

The present inventors used a semiconductor laser, which emits a "0.405 μm" blue laser beam, as the laser source 111 and observed the sample SMP. The present inventors used the objective lens 231 having a "0.85" numerical aperture NA. Meanwhile, the spot diameter in the sample SMP was "0.25 μm" (full-width at half-maximum). The present inventors set a diameter of the pinhole 223 to "0.8 times" as large as the Airy disk diameter of the multiplexed beam MPB condensed by the detection lens 222C. Accordingly, the present inventors achieved a resolution of no more than "0.2" μm in the XY plane. The present inventors applied the high-frequency current superimposition techniques to the laser beam LB and used the pinhole member 221C to achieve "0.92 μm" resolution in the depth direction.

Figure 16:
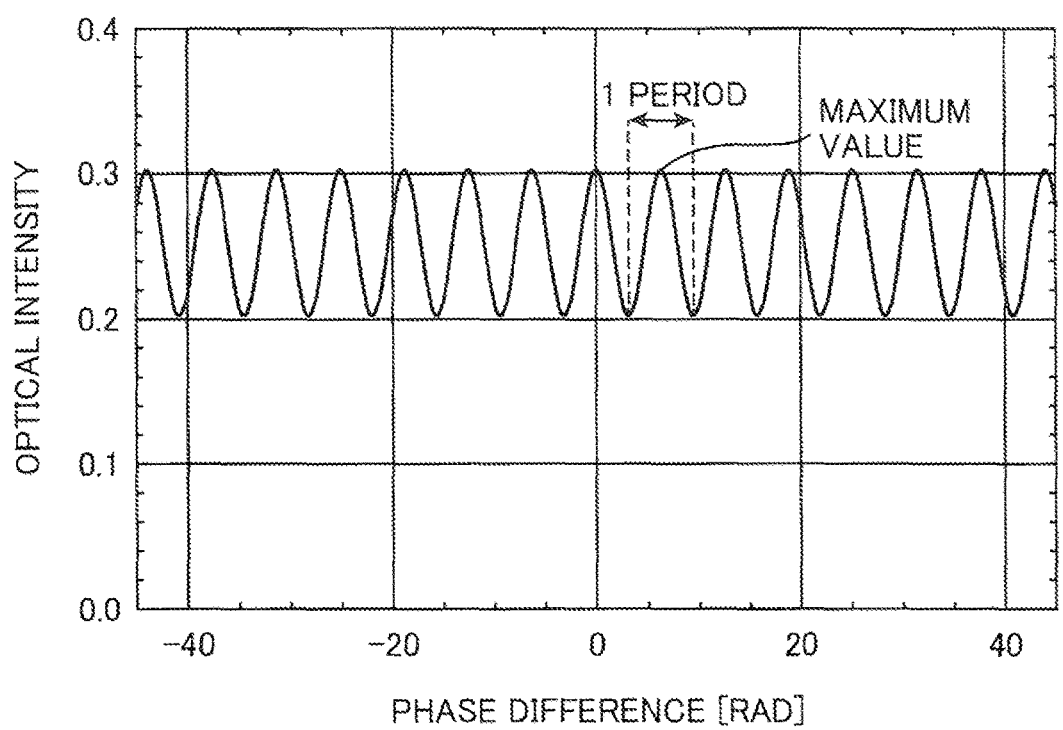
FIG. 16 is a schematic graph showing a variation in optical intensity of a multiplexed beam.

FIG. 16 is a schematic graph showing a variation in optical intensity of the multiplexed beam MPG. The multiplexed beam MPB is described with reference to FIGS. 6, 9A, 9B and 16.

The coherence length of the laser beam LB may be no less than several hundreds of micrometers. When a difference between the optical path lengths "py" and "pz" shown in FIGS. 9A and 9B is no more than the coherence length of the laser beam LB, the sinusoidal intensity variation of the multiplexed beam MPB shown in FIG. 16 may be obtained. As shown in FIG. 16, the maximum value in each period is substantially constant. When an incoherent beam is used, the maximum value of the sinusoidal optical intensity is significantly reduced by an increase in optical path length difference.

Since the maximum value of the sinusoidal intensity variation of the multiplexed beam MPB is substantially constant, it becomes easy to set an initial position of the mirror 151. When the mirror 151 is moved in an interval in correspondence to one period (phase quantity corresponding to $2\pi$ (rad)) from the appropriately set initial position, the very intensive multiplexed beam MPB is transmitted to the photodetector 131. The image generator 140 extracts a signal component representing substantially the maximum light quantity from the detection signal within a phase modulation interval over one period, the detection signal being output from the photodetector 131.

<Fifth Embodiment>

A laser source portion may include a plurality of laser sources. When the laser sources emit laser beams which are different in wavelength, a resultant sample image may be represented in a plurality of hues. An image generation device including a plurality of laser sources is described in the present embodiment.

Figure 17:
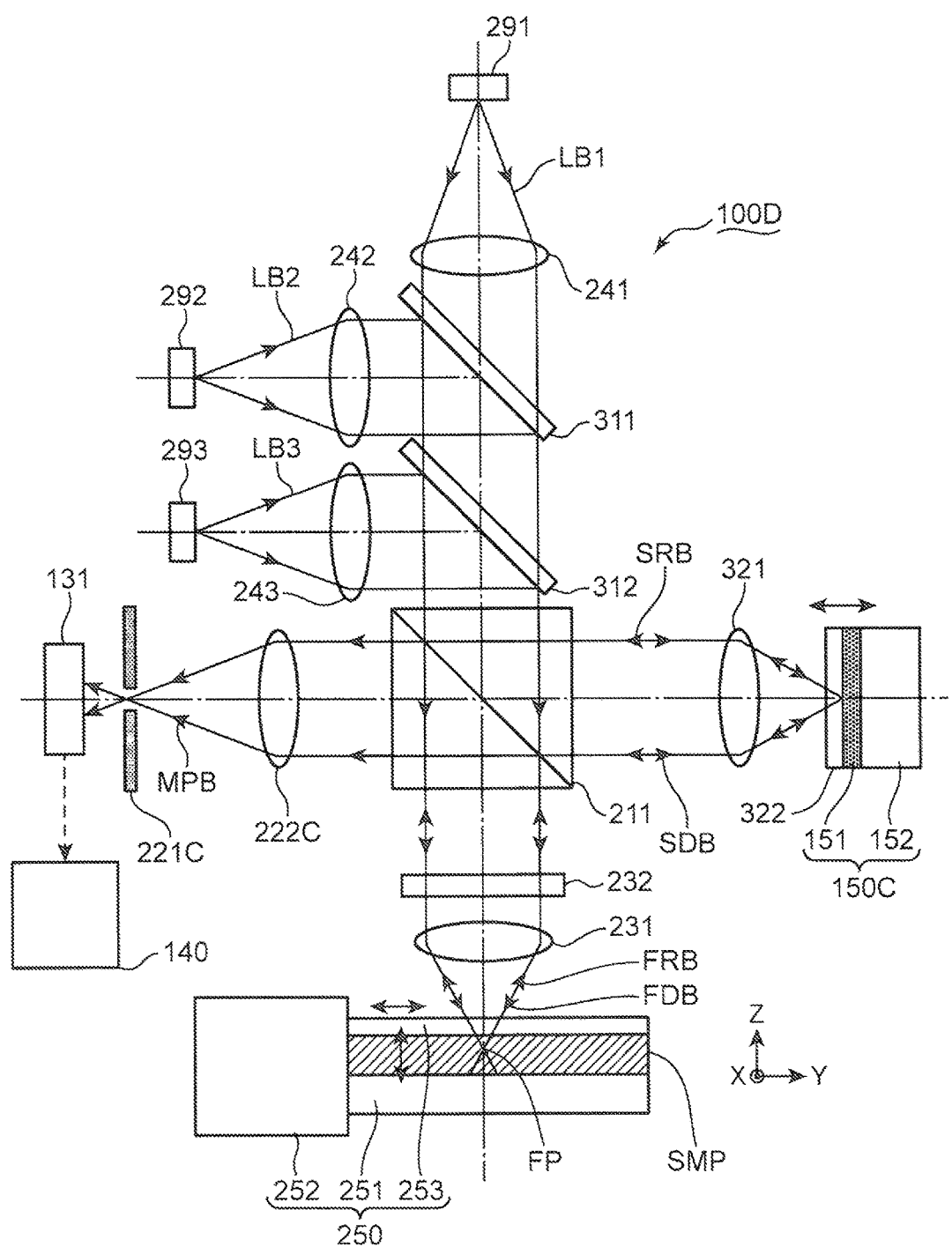
FIG. 17 is a schematic view of an image generation device according to the fifth embodiment.

FIG. 17 is a schematic view of an image generation device 100D according to the fifth embodiment. The image generation device 100D is described with reference to FIGS. 5 and 17. Each of the solid arrows in FIG. 17 represents beam propagation. The dotted arrow in FIG. 17 represents signal transmission. Reference numerals used commonly in the fourth and fifth embodiments indicate that components designated by the common reference numerals have the same functions as the fourth embodiment. Therefore, the description of the fourth embodiment is applicable to these components.

Like the fourth embodiment, the image generation device 100D includes the photodetector 131, the image generator 140, the modulator 150C, the beam demultiplexing element 211, the pinhole member 221C, the detection lens 222C, the objective lens 231, the correction element 232 and the position adjustment mechanism 250. The image generation device 100D includes a first laser source 291, a second laser source 292 and a third laser source 293. The first, second and third laser sources 291, 292, 293 correspond to the laser source portion 110 shown in FIG. 5. The first laser source 291 emits a first laser beam LB1. The second laser source 292 emits a second laser beam LB2. The third laser source 293 emits a third laser beam LB3.

The image generation device 100D further includes a first collimator lens 241, a second collimator lens 242 and a third collimator lens 243. The first laser source 291 emits the first laser beam LB1 as a divergent beam toward the first collimator lens 241. The first collimator lens 241 changes the first laser beam LB1 into a collimated beam. The second laser source 292 emits the second laser beam LB2 as a divergent beam toward the second collimator lens 242. The second collimator lens 242 changes the second laser beam LB2 into a collimated beam. The third laser source 293 emits the third laser beam L83 as a divergent beam toward the third collimator lens 243. The third collimator lens 243 changes the third laser beam LB3 into a collimated beam.

The image generation device 100D includes a first dichroic mirror 311 and a second dichroic mirror 312. The first dichroic mirror 311 allows transmission of the first laser beam LB1 and reflects the second laser beam LB2 to the second dichroic mirror 312. Consequently, each of the first and second laser beams LB1, LB2 propagates toward the second dichroic mirror 312. The second dichroic mirror 312 transmits each of the first and second laser beams LB1, LB2 to the bean demultiplexing element 211 and reflects the third laser beam LB3 toward the beam demultiplexing element 211. Accordingly, the first, second and third laser beams LB1, LB2, LB3 propagate to the beam demultiplexing element 211.

The first, second and third laser sources 291, 292, 293 independently emit laser beams (first, second and third laser beams LB1, LB2, LB3) different in wavelength. The photodetector 131 generates detections signals in correspondence to the first, second and third laser beams LB1, LB2, LB3. The image generator 140 generates a sample image in response to the detection signal, which corresponds to the first laser beam LB1, a sample image in response to the detection signal, which corresponds to the second laser beam LB2, and a sample image in response to the detection signal, which corresponds to the third laser beam LB3. In addition, the image generator 140 may combine two of the sample images. The resultant sample image from the combining process by the image generator 140 may contain information which is included in the two sample images.

One of the first, second and third laser sources 291, 292, 293 may be a red laser source which emits a red laser beam (e.g. a laser beam having a wavelength of no less than 0.60 μm and no more than 0.64 μm). Another of the first, second and third laser sources 291, 292, 293 may be a green laser source which emits a green laser beam (e.g. a laser beam having a wavelength of no less than 0.50 μm and no more than 0.54 μm). The remaining one of the first, second and third laser sources 291, 292, 293 may be a blue laser source which emits a blue laser beam (e.g. a laser beam having a wavelength of no less than 0.44 μm and no more than 0.48 μm). In this case, the photodetector 131 outputs a red detection signal in correspondence to the red laser beam. The photodetector 131 outputs a green detection signal in correspondence to the green laser beam. The photodetector 131 outputs a blue detection signal in correspondence to the blue laser beam. The image generator 140 generates a red sample image on the basis of the red detection, signal, a green sample image on the basis of the green detection signal, and a blue sample image on the basis of the blue detection signal. The image generator 140 may combine the three sample images to generate a combined sample image. In this case, four combinations including a combination of the red and green sample images, a combination of the red and blue sample images, a combination of the green and blue sample images, and a combination of the red, green and blue sample images are provided. In particular, when the red, green and blue sample images are combined, a typical color image may be produced. As long as wavelengths of the laser beams are in the aforementioned wavelength range, color sample images may be generated in a wide color representation range by semiconductor lasers.

Unlike the fourth embodiment, the image generation device 100D uses a plurality of laser beams (first, second and third laser beams LB1, LB2, LB3) having various wavelengths to generate the sample images. Accordingly, a larger amount of information than what is obtained in the fourth embodiment may be obtained from the sample images. When a living cell is used as the sample SMP and when a part of the living cell reacts with a laser beam having a specified wavelength, the part of the living cell may be appropriately extracted from the sample image.

The principles of the present embodiment are not limited to the aforementioned wavelength range. One of the first, second and third laser sources 291, 292, 293 may emit a laser beam having a wavelength of no less than 0.35 μm and no more than 0.45 μm. Another of the first, second and third laser sources 291, 292, 293 may emit a laser beam having a wavelength of no less than 0.60 μm and no more than 0.70 μm. The remaining one of the first, second and third laser sources 291, 292, 293 may emit a laser beam having a wavelength of no less than 0.73 μm and no more than 0.83 μm. When these wavelength ranges are used, sample images may be easily generated by semiconductor lasers.

The image generation device 100D further includes a beam condensing lens 321 and a transparent substrate 322. The beam condensing lens 321 and the transparent substrate 322 may be used as a part of the convertor 120B shown in FIG. 5.

The beam condensing lens 321 is situated between the mirror 151 and the beam demultiplexing element 211. The transparent substrate 322 is situated between the beam condensing lens 321 and the mirror 151. The beam condensing lens 321 condenses the second demultiplexed beam SDB toward the mirror 151 through the transparent substrate 322. The transparent substrate 322 corrects aberration of the second demultiplexed beam SDB. In the present embodiment, the condenser is exemplified by the beam condensing lens 321. The second corrector is exemplified by the transparent substrate 322.

The minor 151 reflects the second demultiplexed beam SDB condensed by the beam condensing lens 321 to generate the second reflected beam SRB as a divergent beam. The beam condensing lens 321 changes the second reflected beam SRB to a collimated beam. The second reflected beam SRB is then incident on the beam demultiplexing element 211.

The objective lens 231 is designed in advance so as to correct spherical aberration resulting from a thickness of the cover glass 253. The transparent substrate 322 may be formed of the same material as that of the cover glass 253. Alternatively, the transparent substrate 322 is designed so that an optical phase quantity proportional to a product of a thickness and a refractive index is equal between the transparent substrate 322 and the cover glass 253. When the beam condensing lens 321 has optical characteristics equivalent to the objective lens 231, aberration characteristics are also equivalent between the beam condensing lens 321 and the objective lens 231. Consequently, the multiplexed beam MPB may have a wave front suitable for generating sample images.

Since the beam condensing lens 231 condenses the second demultiplexed beam SDB onto the mirror 151 to generate the second reflected beam SRB, the second reflected beam SRB is less likely to be affected by a tilt of the mirror 151. Consequently, there are simplified optical settings for generating the multiplexed beam MPB.

<Sixth Embodiment>

The principles of the fourth and fifth embodiments make it possible to generate sample images from a reflected beam from a sample. When the sample image is generated additionally from a transmitted beam passing through the sample, an observer may acquire a large amount of information from the sample image. An image generation device which uses a reflected beam and a transmitted beam to generate a sample image is described in the present embodiment.

Figure 18:
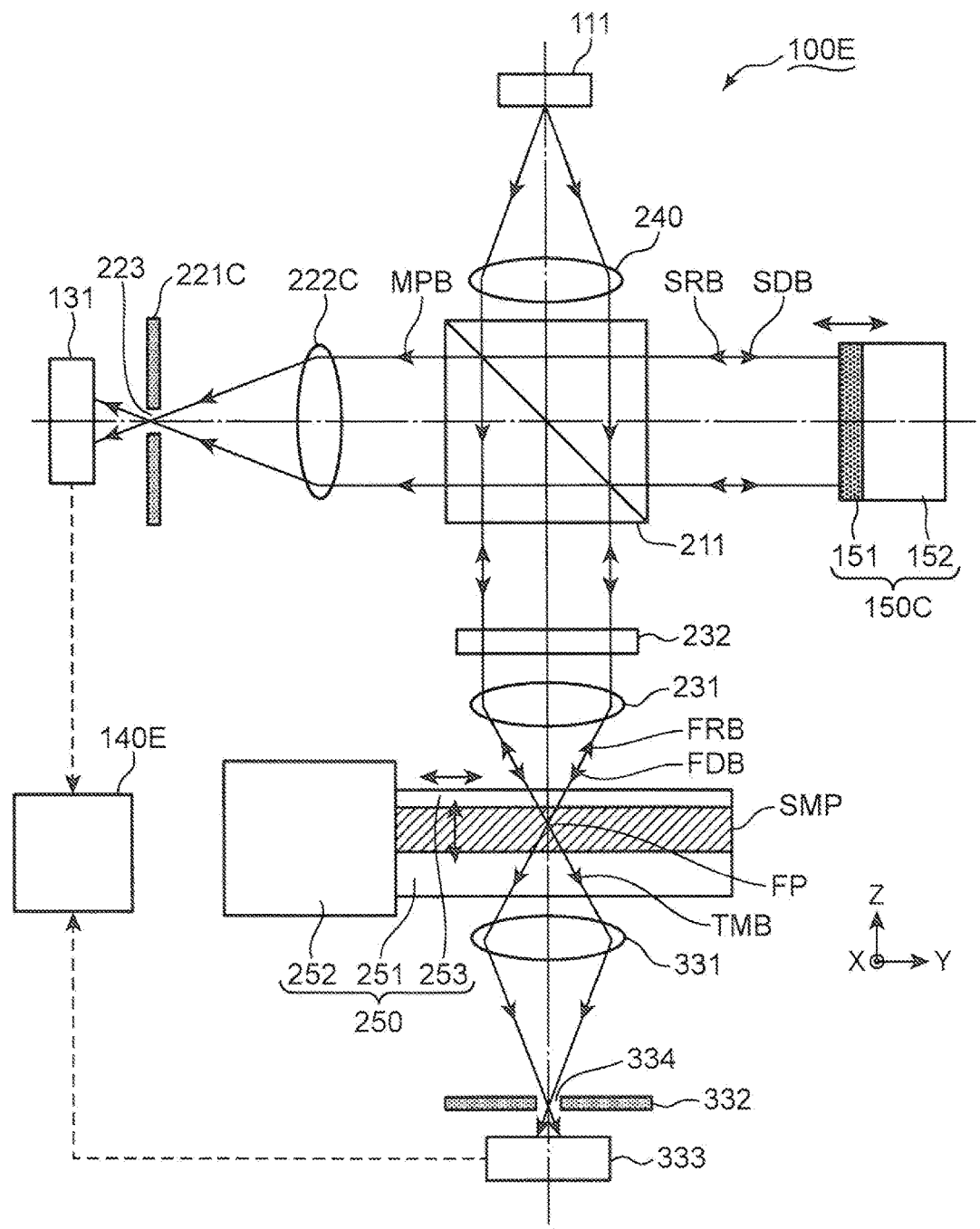
FIG. 18 is a schematic view of an image generation device according to the sixth embodiment.

FIG. 18 is a schematic view of an image generation device 100E according to the sixth embodiment. The image generation device 100E is described with reference to FIG. 18. Each of the solid arrows in FIG. 18 represents beam propagation. The dotted arrow in FIG. 18 represents signal transmission. Reference numerals used commonly in the fourth and sixth embodiments indicate that components designated by the common reference numerals have the same functions as the fourth embodiment. Therefore, the description of the fourth embodiment is applicable to these components.

Like the fourth embodiment, the image generation device 100E includes the laser source 111, the collimator lens 240, the photodetector 131, the modulator 150C, the beam demultiplexing element 211, the pinhole member 221C, the detection lens 222C, the objective lens 231, the correction element 232 and the position adjustment mechanism 250. The image generation device 100E further includes an image generator 140E, a detection lens 331, a pinhole member 332 and a photodetector 333.

The objective lens 231 condenses the first demultiplexed beam FDB toward the sample SMP to form the focal point FP. A part of the first demultiplexed beam FDB propagates as the first reflected beam FRB to the objective lens 231. Another part of the first demultiplexed beam FDB passes through the sample SMP and the stage 251 as a transmitted beam TMB which propagate as a divergent beam to the detection lens 331.

Like the pinhole member 221C, the pinhole member 332 is formed with a pinhole 334. The pinhole 334 may be sized by the same method as what is used to sue the pinhole 223 described in the context of the fourth embodiment.

The detection lens 331 condenses the transmitted beam TMB to the pinhole 334. The transmitted beam TMB passing through the pinhole 334 is incident on the photodetector 333. The photodetector 333 generates a detection signal in correspondence to a light quantity of the transmitted beam TMB. The detection signal is output from the photodetector 333 to the image generator 140E. In the present embodiment, the second signal generator is exemplified by the photodetector 333. The second detection signal is exemplified by the detection signal generated by the photodetector 333. The second defining portion is exemplified by the pinhole member 332. The second transmissive region is exemplified by the pinhole 334. The second condenser is exemplified by the detection lens 331. The second signal generation step is the signal processes executed by the photodetector 333 to generate the detection signal in correspondence to a light quantity of the transmitted beam TMB.

The image generator 140E extracts a signal component from the detection signal output from the photodetector 131 to generate a reflection image of the sample SMP as a sample image, the signal component representing substantially a maximum light quantity. In addition, the image generator 140E uses the detection signal generated by the photodetector 333 to generate a transmission image of the sample SMP as a sample image. The principles of the present embodiment allow the transmission and reflection images to be obtained in a time shorter than what is achieved by a device configured to individually and separately acquire the transmission and reflection images.

Figure 19:
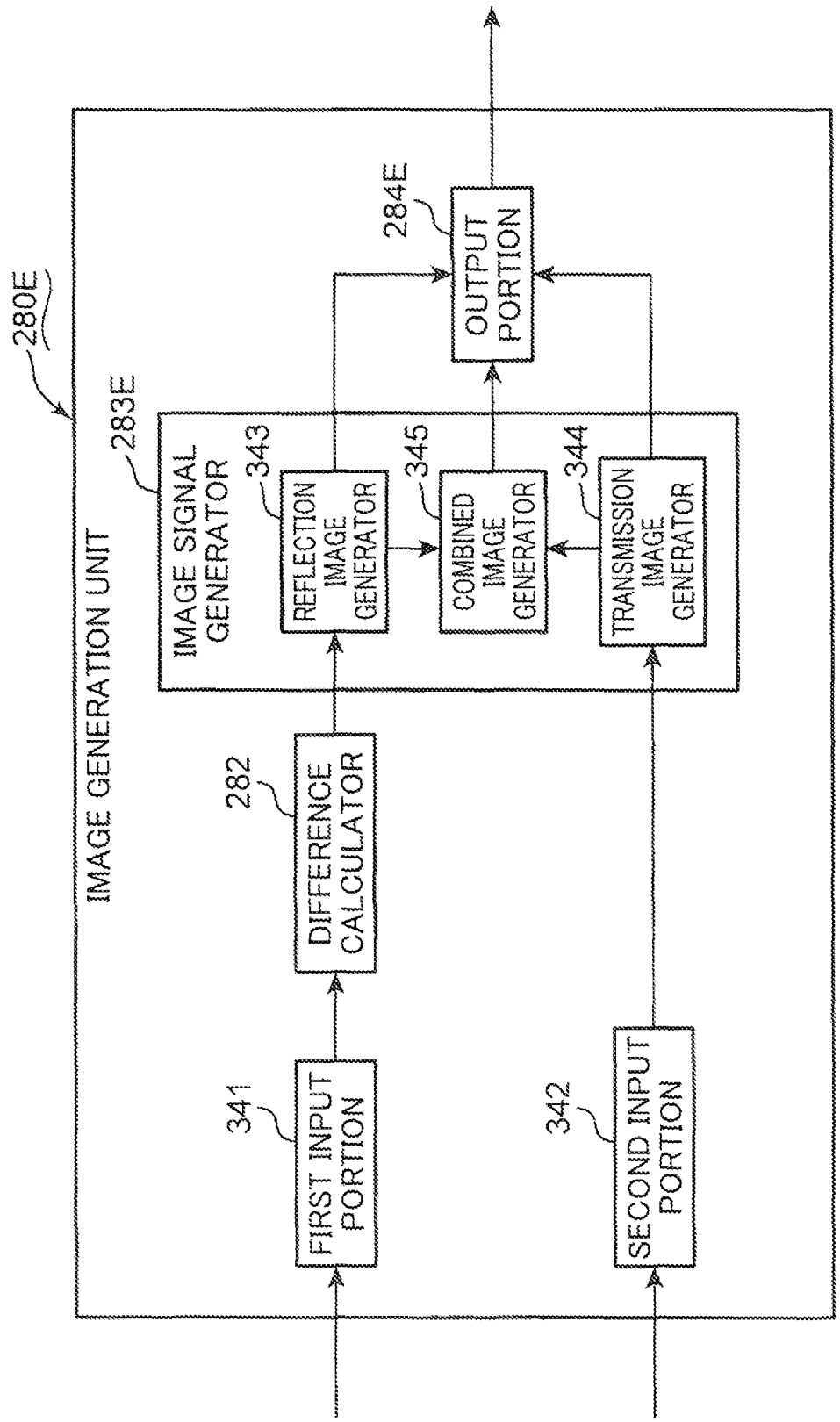
FIG. 19 is a schematic block diagram of an image generation unit exemplified as an image generator of the image generation device shown in FIG. 18.

FIG. 19 is a schematic block diagram of an image generation unit 280E exemplified as the image generator 140E. The image generation unit 280E is described with reference to FIGS. 18 and 19.

Like the fourth embodiment, the image generation unit 280E includes the difference calculator 282. The image generation unit 280E includes a first input portion 341, a second input portion 342, an image signal generator 283E and an output portion 284E. The image signal generator 283E includes a reflection image generator 343, a transmission image generator 344 and a combined image generator 345.

The photodetector 131 outputs a detection signal to the first input portion 341. The detection signal is then subjected to the difference calculation processes by the difference calculator 282. The reflection image generator 343 extracts a signal component from the detection signal after the difference calculation process to generate data representing a reflection image of the sample SMP, the signal component representing substantially the maximum light quantity. The data representing a reflection image of the sample SMP is output from the output portion 284E to an external device (not shown) such as a display device.

The photodetector 333 outputs the detection signal to the second input portion 342. The detection signal is then output to the transmission image generator 344. The transmission image generator 344 generates data representing a transmission image of the sample SMP on the basis of the detection signal. The data representing a transmission image of the sample SMP is output from the output portion 284E to an external device (not shown) such as a display device.

The data representing a reflection image of the sample SMP is also output from the reflection image generator 343 to the combined image generator 345. The data representing a transmission image of the sample SMP is also output from the transmission image generator 344 to the combined image generator 345. The combined image generator 345 uses the data, which represents a reflection image of the sample SMP, and the data, which represents a transmission image of the sample SMP, to generate data representing the combined image. The data representing the combined image is output from the output portion 284B to an external device (not shown) such as a display device.

Figure 20:
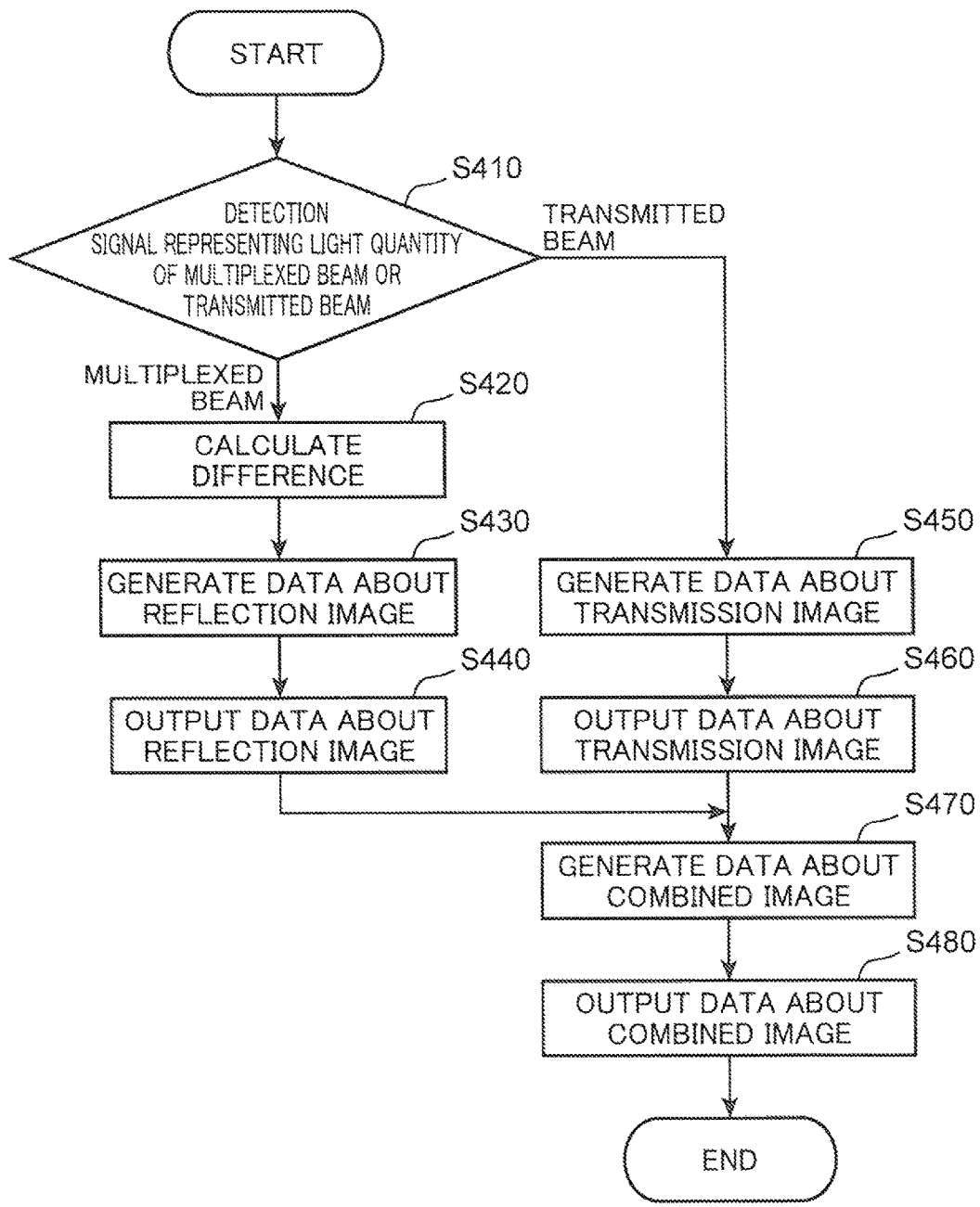
FIG. 20 is a schematic flow chart showing operation of the image generation unit depicted in FIG. 19.

FIG. 20 is a schematic flow chart showing operation of the image generation unit 280E in the image generation step (Step S140 described with reference to FIG. 3). The operation of the image generation unit 280E is described with reference to FIGS. 3 and 18 to 20.

(Step S410)

After the signal generation step (Step S130) described with reference to FIG. 3, Step S410 is performed. In Step S410, the image generation unit 280E receives detection signals from the photodetectors 131, 333. When the first input portion 341 receives the detection signal from the photodetector 131, Step S420 is performed. When the second input portion 342 receives the detection signal from the photodetector 333, Step S450 is performed.

(Step S420)

In Step S420, the detection signal is output from the first input portion 341 to the difference calculator 282. The difference calculator 282 subtracts data acquired in the absence of the sample SMP (or under a condition that reflectance of the sample SMP is "0") from data represented by the detection signal output in the presence of the sample SMP to generate the difference data. The difference data is output from the difference calculator 282 to the reflection image generator 343. Step S430 is then performed.
(Step S430)
In Step S430, the reflection image generator 343 generates data representing a reflection image of the sample SMP on the basis of the difference data. Step S440 is then performed.
(Step S440)
In Step S440, the reflection image generator 343 outputs the data representing a reflection image of the sample SMP to each of the output portion 284E and the combined image generator 345. Step S470 is then performed.
(Step S450)
In Step S450, the transmission image generator 344 generates data representing a transmission image of the sample SMP on the basis of the detection signal from the photodetector 333. Step S460 is then performed.
(Step S460)
In Step S460, the transmission image generator 344 outputs the data representing a transmission image of the sample SMP to each of the output portion 284E and the combined image generator 345. Step S470 is then performed.
(Step S470)
In Step S470, the combined image generator 345 generates a combined image by using the data, which represents a reflection image of the sample SMP, and the data, which represents a transmission image of the sample SMP. Step S480 is then performed.
(Step S480)
In Step S480, the combined image generator 345 outputs data representing the combined image, in which the reflection image and the transmission image are combined, to the output portion 284E. Accordingly, an observer may observe the combined image in which the reflection image and the transmission image are combined.

In accordance with the principles of the present embodiment, not only the reflection image but also the transmission image of the sample SMP may be obtained. This allows the observer to obtain a large amount of internal information from the sample SMP. The reflection image of the sample SMP mainly includes information associated with a refractive index distribution in the sample SMP. On the other hand, the transmission image of the sample SMP mainly includes information associated with an extinction coefficient distribution in the sample SMP. The observer may use these images to appropriately recognize the information about the interior of the sample SMP.

When a degree of transparency of the sample SMP is high, the observer may generally acquire a larger amount of information from the transmission image. However, when the sample SMP is excessively thick or when the sample SMP includes a region (e.g. a neuron) having a high optical absorptance, the observer may not obtain a large amount of information front the transmission image. In such a case, the reflection image is likely to include a lot of information which may not be represented by the transmission image. Accordingly, when the combined image generator 345 performs arithmetic operation processes (addition and/or subtraction) using the data about the reflection image generated by the reflection image generator 343 and the data about the transmission image generated by the transmission image generator 344, the combined image representing information contained in each of the reflection and transmission images may be generated.

A beam condensing member formed of a combination of a plurality of lens elements may be used instead of the detection lens 331. When the beam condensing member is designed so as to match with optical characteristics of the objective lens 231 and the detection lens 222C, the beam condensing member may cause the pinhole member 332 to remove unneeded optical components such as optical aberration, and cause the photodetector 333 to generate a detection signal from a beam passing through the sample SMP under enhanced optical resolution, like the detection lens 331.

<Seventh Embodiment>

The principle of the fifth embodiment may be combined with the principles of the sixth embodiment. An image generation device is described in the present embodiment which uses laser beams different in wavelength to generate a reflection image, a transmission image and a combined image thereof.

Figure 21:
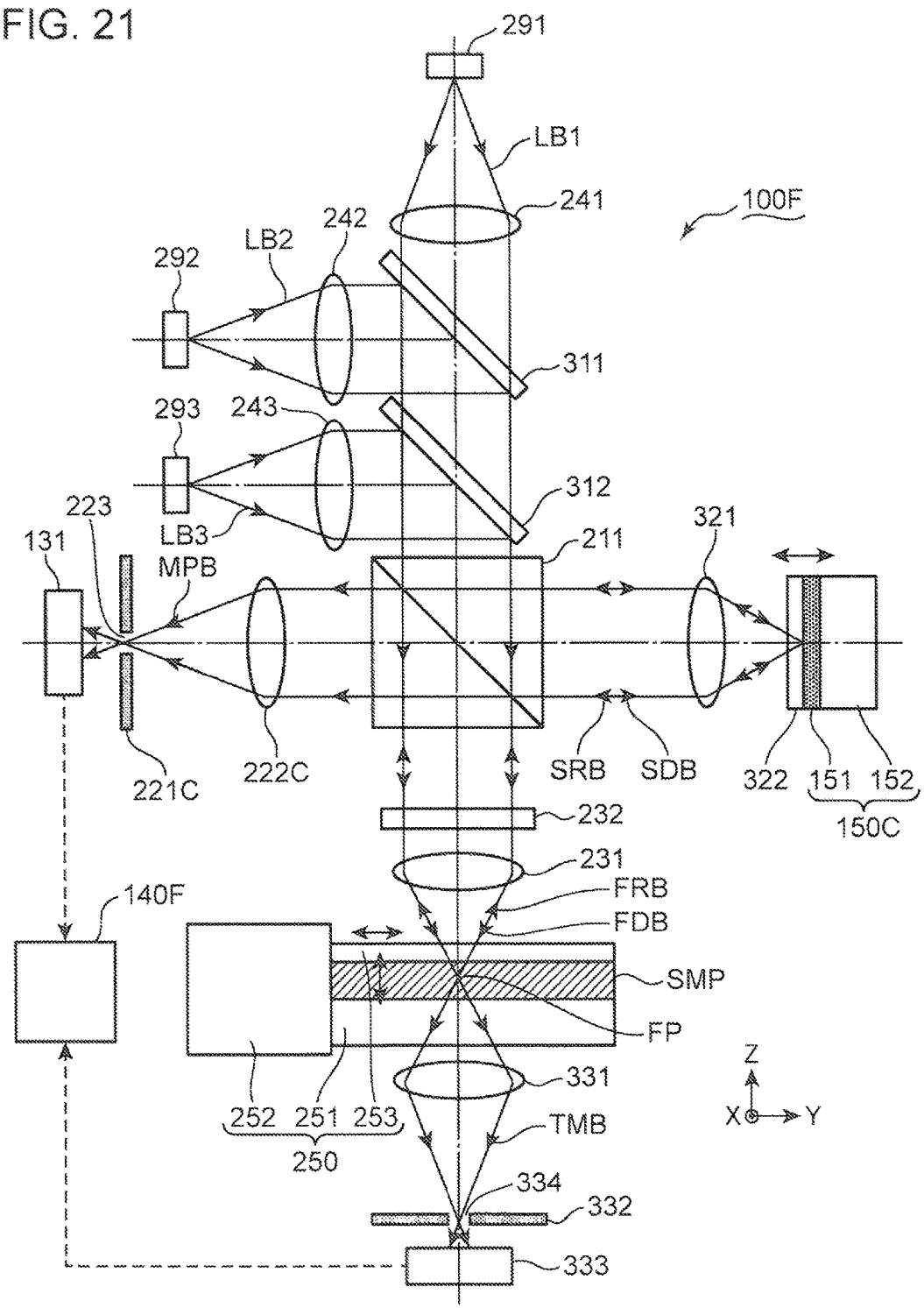
FIG. 21 is a schematic view of an image generation device according to the seventh embodiment.

FIG. 21 is a schematic view of an image generation device 100F according to the seventh embodiment. The image generation device 100F is described with reference to FIG. 21. Each of the solid arrows in FIG. 21 represents beam propagation. The dotted arrow in FIG. 21 represents signal transmission. Reference numerals used commonly in the fifth and seventh embodiments indicate that components designated by the common reference numerals have the same functions as the fifth or sixth embodiment. Therefore, the description of the fifth or sixth embodiment is applicable to these components.

Like the fifth embodiment, the image generation device 100F includes the first laser source 291, the second laser source 292, the third laser source 293, the first collimator lens 241, the second collimator lens 242, the third collimator lens 243, the first dichroic mirror 311, the second dichroic mirror 312, the beam condensing lens 321 and the transparent substrate 322. Like the sixth embodiment, the image generation device 100F includes the photodetectors 131, 333, the modulator 150C, the beam demultiplexing element 211, the pinhole members 221C, 332, the detection lenses 222C, 331, the objective lens 231, the correction element 232 and the position adjustment mechanism 250. The image generation device 100F further includes an image generator 140F.

Like the fifth embodiment, the first laser source 291 emits the first laser beam LB1. The second laser source 292 emits the second laser beam LB2. The third laser source 293 emits the third laser beam LB3. The first, second and third laser beams LB1, LB2, LB3 are different in wavelength. Each of the first, second and third laser beams LB1, LB2, LB3 is incident on the beam demultiplexing element 211. The beam demultiplexing element 211 demultiplexes each of the first, second and third laser beams LB1, LB2, LB3 into the first and second demultiplexed beams FDB, SDB. The sample SMP reflects a part of the first &multiplexed beam FDB to generate the first reflected beam FRB. The minor 151 reflects the second demultiplexed beam SDB to generate the second reflected beam SRB. The beam demultiplexing element 211 multiplexes the first and second reflected beams FRB, SRB to generate the multiplexed beam MPB. The multiplexed beam MPB passes through the pinhole 223 of the pinhole member 221C to be incident on the photodetector 131. The photodetector 131 generates a detection signal in correspondence to a light quantity of the multiplexed beam MPB. The detection signal generated by the photodetector 131 includes a signal representing a light quantity component derived from the first laser beam LB1, a signal representing a light quantity component derived from the second laser beam LB2, and a signal representing a light quantity component derived from the third laser beam LB3. These signals are output from the photodetector 131 to the image generator 140F.

Another part of the first demultiplexed beam FDB passes through the sample SMP to become the transmitted beam TMB. Like the sixth embodiment, the detection lens 331 condenses the transmitted beam TMB to the pinhole 334 of the pinhole member 332. The transmitted beam TMB is subsequently incident on the photodetector 333. The photodetector 333 generates a detection signal in correspondence to a light quantity of the transmitted beam TMB. The detection signal generated by the photodetector 333 includes a signal representing a light quantity component derived from the first laser beam LB1, a signal representing a light quantity component derived from the second laser beam LB2, and a signal representing a light quantity component derived from the third laser beam LB3. These signals are output from the photodetector 333 to the image generator 140F.

The image generator 140F may generate sample images derived from the reflected beams of the first, second and third laser beams LB1, LB2, LB3 from the detection signal output from the photodetector 131. The image generator 140F may generate sample images derived from the transmitted beams of the first, second and third laser beams LB1, LB2, LB3 from the detection signal output from the photodetector 333. In addition, the image generator 140F may combine these sample images to generate combined images. This allows an observer to acquire a variety of information about the sample SMP.

<Eighth Embodiment>

The principles of each of the fourth to seventh embodiments use a displaceable mirror for phase modulation. Alternatively, phase modulation may be performed under electro-optical effects. An image generation device is described in the present embodiment, which uses electro-optical effects to perform phase modulation.

Figure 22:
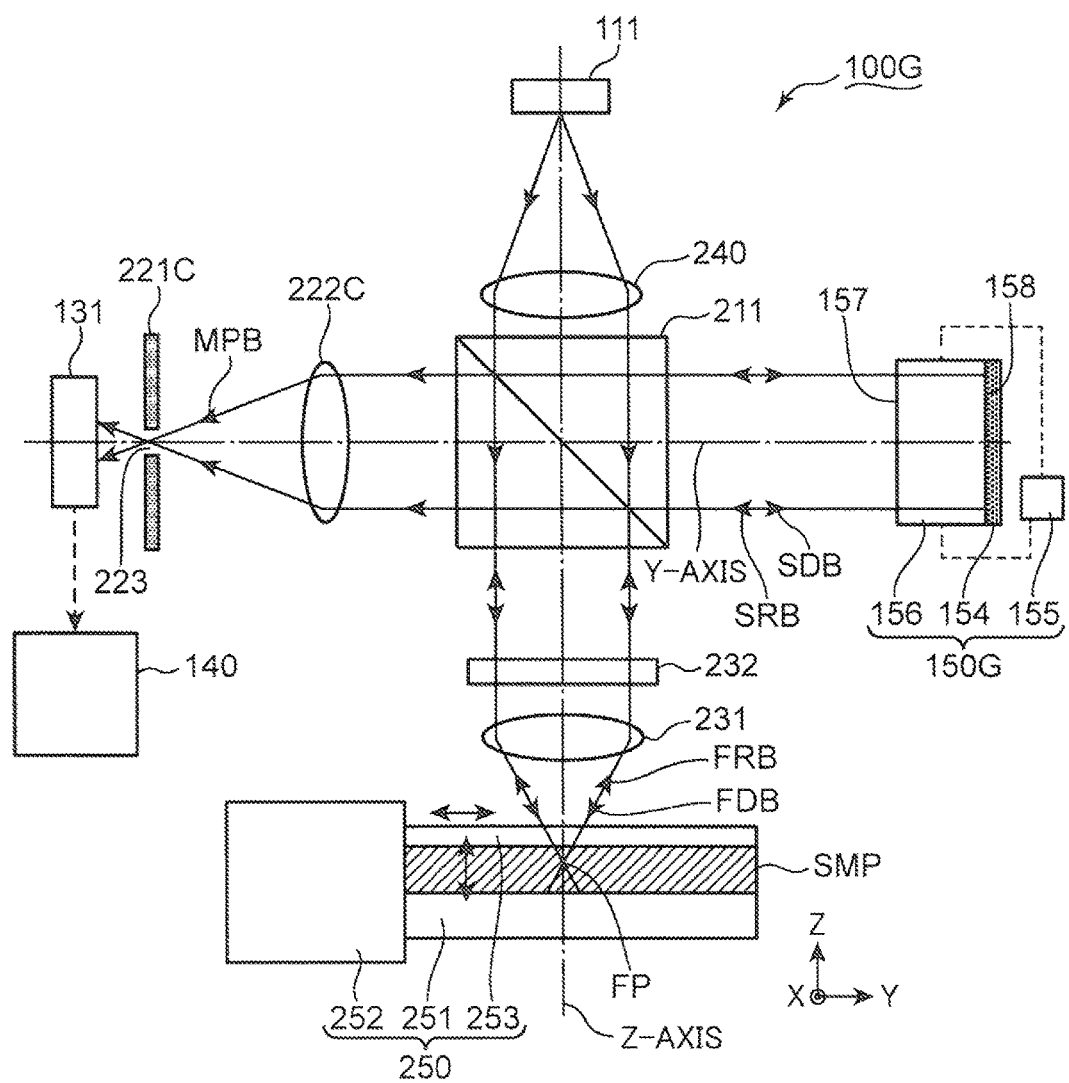
FIG. 22 is a schematic view of an image generation device according to the eighth embodiment.

FIG. 22 is a schematic view of an image generation device 100G according to the eighth embodiment. The image generation device 100G is described with reference to FIG. 22. Each of the solid arrows in FIG. 22 represents beam propagation. The dotted arrow in FIG. 22 represents an electric transmission path. Reference numerals used commonly in the fourth and eighth embodiments indicate that components designated by the common reference numerals have the same functions as the fourth embodiment. Therefore, the description of the fourth embodiment is applicable to these components.

Like the fourth embodiment, the image generation device 100G includes the laser source 111, the collimator lens 240, the photodetector 131, the image generator 140, the beam demultiplexing element 211, the pinhole member 221C, the detection lens 222C, the objective lens 231, the correction element 232, and the position adjustment mechanism 250. The image generation device 100G further includes a modulator 150G. The modulator 150G includes a reflection film 154, an applicator 155 and a crystal element 156.

The crystal element 156 includes an incidence end surface 157 and an opposite surface 158 opposite to the incidence end surface 157. The reflection film 154 covers the opposite surface 158. The second demultiplexed beam SDB is incident on the incidence end surface 157. The second demultiplexed beam SDB subsequently propagates in the crystal element 156. The reflection film 154 reflects the second demultiplexed beam SDB to generate the second reflected beam SRB.

The crystal element 156 may be a transparent electro-optical crystal of $LiNbO_3$, $LiTaO_3$ or PLZT. The crystal element 156 may be about 1 cm in length in the Y-axis direction. The crystal element 156 may be about 2 mm in thickness in the Z-axis direction.

The crystal element 156 changes a refractive index under the electro-optical effect when the applicator 155 applies a voltage to the crystal element 156, for example, so as to cause an electric field in the crystal element 156 in the Y-direction. Unlike the mechanical phase modulation techniques in each of the fourth to seventh embodiments, the phase is modulated under the electro-optical effect in the present embodiment. Since there are fewer mechanically operating portions, the image generation device 100G may have a long life time. In addition, the image generation device 100G may have structural stability and quick response performance. In the present embodiment, the reflection mechanism is exemplified by the modulator 150G.

Like the fourth embodiment, the refractive index may be changed appropriately within a range in which a light quantity of the multiplexed beam MPB varies over one period. Accordingly, the applicator 155 does not have to apply an excessively high voltage to the crystal element 156. Alternatively, the crystal element 156 does not have to be excessively long in the Y-direction. The $2\pi$ (rad) phase modulation is caused when $LiNbO_3$ is used as the crystal element 156 and when the applicator 155 applies a voltage of 400 V to the crystal element 156.

<Ninth Embodiment>

The principles of the sixth embodiment may be combined with the principles of the eighth embodiment. An image generation device is described in the present embodiment, which uses laser beams different in wavelength to generate a reflection image, a transmission image and a combined image.

Figure 23:
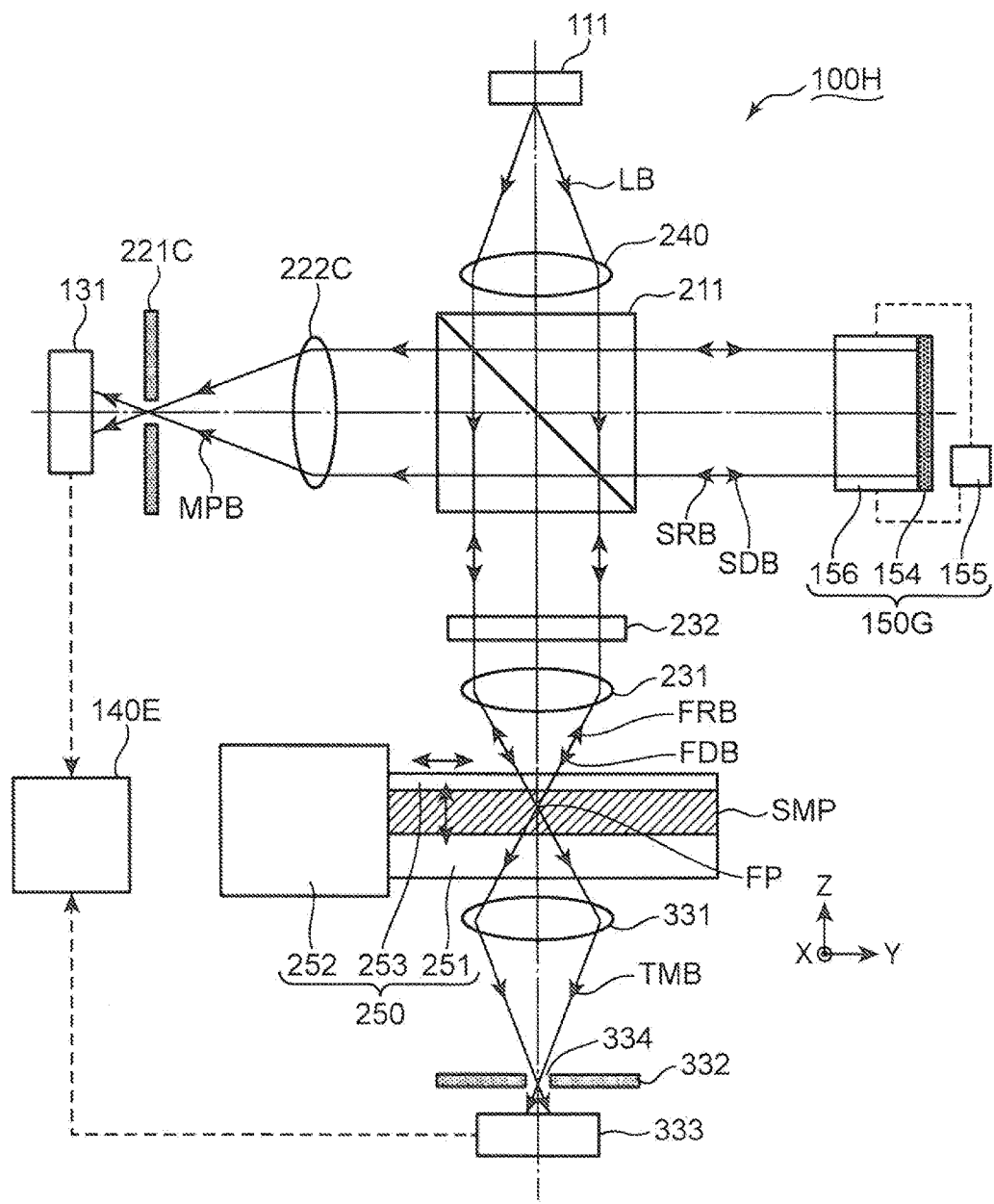
FIG. 23 is a schematic view of an image generation device according to the ninth embodiment.

FIG. 23 is a schematic view of an image generation device 100H according to the ninth embodiment. The image generation device 100H is described with reference to FIG. 23. Each of the solid arrows in FIG. 23 represents beam propagation. The dotted arrow in FIG. 23 represents an electric transmission path. Reference numerals used commonly in the sixth, eighth and ninth embodiments indicate that components designated by the common reference numerals have the same functions as the sixth or eighth embodiment. Therefore, the description of the sixth or eighth embodiment is applicable to these components.

Like the sixth embodiment, the image generation device 100H includes the laser source 111, the collimator lens 240, the photodetector 131, the beam demultiplexing element 211, the pinhole member 221C, the detection lens 222C, the objective lens 231, the correction element 232, the position adjustment mechanism 250, the image generator 140E, the detection lens 331, the pinhole member 332 and the photodetector 333. Like the eighth embodiment, the image generation device 100H further includes the modulator 150G.

The objective lens 231 condenses the first demultiplexed beam FDB toward the sample SMP to generate the focal point FP. A part of the first demultiplexed beam FDB propagates as the first reflected beam FRB to the objective lens 231. Another part of the first demultiplexed beam FDB passes through the sample SMP and the stage 251 as the transmitted beam TMB and propagates as a divergent beam to the detection lens 331.

The detection lens 331 condenses the transmitted beam TMB toward the pinhole 334. The transmitted beam TMB passing through the pinhole 334 is incident on the photodetector 333. The photodetector 333 generates a detection signal in correspondence to a light quantity of the transmitted beam TMB. The detection signal is output from the photodetector 333 to the image generator 140E.

The image generator 140E extracts a signal component from the detection signal output from the photodetector 131 to generate a reflection image of the sample SMP as a sample image, the signal component representing substantially a maximum light quantity. In addition, the image generator 140E uses the detection signal generated by the photodetector 333 to generate a transmission image of the sample SMP as a sample image. The principles of the present embodiment allow the transmission and reflection images to be obtained in a shorter time than what is achieved by a device configured to individually and separately acquire the transmission and reflection images.

In accordance with the principles of the sixth embodiment, the image generator 140E may generate a combined image in which the transmission and reflection images are combined.

In accordance with the principles of the present embodiment, not only the reflection image but also the transmission image of the sample SMP may be obtained. This allows an observer to obtain a large amount of internal information from the sample SMP. The reflection image of the sample SMP mainly includes information associated with a refractive index distribution in the sample SMP. On the other hand, the transmission image of the sample SMP mainly includes information associated with an extinction coefficient distribution in the sample SMP. The observer may use these images to appropriately recognize the information about the interior of the sample SMP.

When a degree of transparency of the sample SMP is high, the observer may generally acquire a larger amount of information from the transmission image. However, when the sample SMP is excessively thick or when the sample SMP includes a region (e.g. a neuron) having a high optical absorptance, the observer may not find a large amount of information from the transmission image. In such a case, the reflection image is likely to include a lot of information which may not be represented by the transmission image. Accordingly, when arithmetic operation processes (addition and/or subtraction) are performed by using the data about the reflection and transmission images, the combined image representing information contained in each of the reflection and transmission images may be generated.

A beam condensing member formed of a combination of a plurality of lens elements may be used instead of the detection lens 331. When the beam condensing member is designed so as to match with optical characteristics of the objective lens 231 and the detection lens 222C, the beam condensing member may cause the pinhole member 332 to remove unneeded optical components, and cause the photodetector 333 to generate a detection signal front the beam passing through the sample SMP under enhanced optical resolution, like the detection lens 331.

The principles of the aforementioned various embodiments may be combined appropriately. A person skilled in the art may construct various image generation techniques on the basis of the disclosure of the aforementioned various embodiments. The technical idea devised by the present inventors includes various techniques included in the aforementioned disclosure. Therefore, the technical idea about the present application is not limited to the specified structures, components or layouts in the aforementioned embodiments. For example, the terms used in the aforementioned embodiments such as objective lens, collimator lens and detection lens are used to clarify the description. The technical idea according to the present application also includes usage of lens elements which may substitute for the objective lens, the collimator lens and the detection lens. In each of the aforementioned embodiments, a living cell is exemplified as a highly transparent sample. However, the technical idea according to the present application is also applicable to another sample with high transparency or another sample with a low reflectance. Hence, the technical idea according to the present application is not limited by the object of the image generation techniques.

The exemplary image generation techniques described in the context of the aforementioned various embodiments mainly include the following features.

An image generation device according to one aspect of the aforementioned embodiments generates a sample image representing a sample. The image generation device includes a laser source portion configured to emit a laser beam, a convertor configured to convert the laser beam into a multiplexed beam, in which a reflected beam resulting from reflection of the laser beam by the sample and a reference beam resulting from modulation of a phase of the laser beam are multiplexed, a first signal generator configured to generate a first detection signal in correspondence to a light quantity of the multiplexed beam, an image generator configured to generate the sample image, and a modulator configured to modulate the phase to cause a periodic variation in the light quantity of the multiplexed beam. The first detection signal includes a signal component representing a change from an increase to a decrease in the periodic variation. The image generator uses the signal component to generate the sample image.

According to the aforementioned configuration, since the image generator uses the signal component representing a change from an increase to a decrease in the periodic variation to generate the sample image, an observer may observe a bright sample image without an excessive increase in power of the laser beam.

In the aforementioned configuration, the convertor may include a beam demultiplexer, which demuitipiexes the laser beam into a first demultiplexed beam for generating the reflected beam and a second demultiplexed beam for generating the reference beam, and an objective lens, which condenses the first demultiplexed beam toward the sample. The sample may have an average refractive index n. The multiplexed beam may have a wavelength $\lambda$. The objective lens may have a numerical aperture NA. The numerical aperture NA may satisfy a relationship given by NA>$(0.186111n\lambda-0.008659934\lambda^2)^{0.5}$.

According to the aforementioned configuration, since the numerical aperture NA satisfies the relationship given by NA>$(0.186111n\lambda-0.008659934\lambda^2)^{0.5}$, there is a high resolution in a direction along the optical path of the first demultiplexed beam.

In the aforementioned configuration, the modulator may include a reflector, which reflects the second demultiplexed beam to generate the reference beam, and a displacement mechanism, which displaces the reflector along an optical path of the second demultiplexed beam to cause the periodic variation.

According to the aforementioned configuration, since the displacement mechanism displaces the reflector along the optical path of the second demultiplexed beam, the optical path of the second demultiplexed beam is adjusted appropriately. Consequently, the light quantity of the multiplexed beam periodically varies during the displacement of the reflector.

In the aforementioned configuration, the displacement mechanism may displace the reflector in an interval in which the light quantity of the multiplexed beam varies over one period.

According to the aforementioned configuration, since a displacement length of the reflector is as long as the interval in which the light quantity of the multiplexed beam varies over one period, the displacement mechanism does not have to displace the reflector over an excessively long distance. Therefore, the image generation device may efficiently generate the sample image.

In the aforementioned configuration, the modulator may include a reflection mechanism which has a refractive index changing under an electro-optical effect, the reflection mechanism reflecting the second demultiplexed beam to generate the reference beam. The reflection mechanism may change the refractive index to cause the periodic variation.

According to the aforementioned configuration, since the reflection mechanism uses an electro-optical effect to change the refractive index, the reflection mechanism may appropriately vary the phase of the second demodulated beam without a mechanical movement. Consequently, the light quantity of the multiplexed beam periodically varies while the reflection mechanism changes the refractive index.

In the aforementioned configuration, the reflection mechanism may change the refractive index within a range in which the light quantity varies over one period.

According to the aforementioned configuration, since the reflection mechanism changes the refractive index within a range in which the light quantity of the multiplexed beam varies over one period, the reflection mechanism may vary the phase of the second demultiplexed beam under consumption of low electric energy. Therefore, the image generation device may efficiently generate the sample image.

In the aforementioned configuration, the convertor may include a positional adjuster configured to adjust a relative positional relationship between the sample and a focal point generated by the objective lens in a direction along an optical path of the first demultiplexed beam.

According to the aforementioned configuration, since the positional adjuster adjusts a relative positional relationship between the sample and a focal point generated by the objective lens in a direction along the optical path of the first demultiplexed beam, an observer may observe an image of the sample at an intended depth position.

In the aforementioned configuration, the convertor may include a first corrector configured to correct spherical aberration of the first demultiplexed beam. The first corrector may correct the spherical aberration on the basis of the positional relationship.

According to the aforementioned configuration, since the first corrector corrects spherical aberration on the basis of a positional relationship between the sample and the focal point, the focal point becomes suitable for observation of the sample.

In the aforementioned configuration, the convertor may include a condenser configured to condense the second demultiplexed beam toward the modulator.

According to the aforementioned configuration, since the condenser condenses the second demultiplexed beam toward the modulator, a tilt of the modulator becomes less influential to generation of the reference beam.

In the aforementioned configuration, the convertor may include a second corrector which corrects aberration between the condenser and the modulator.

According to the aforementioned configuration, since the second corrector corrects the aberration between the condenser and the convertor, the multiplexed beam has a wave front which is suitable for generating the sample image.

In the aforementioned configuration, the beam demultiplexer may multiplex the reflected beam and the reference beam to generate the multiplexed beam. The convertor may include a first defining portion configured to define a first transmissive region, which allows transmission of the multiplexed beam, and a first condenser, which condenses the multiplexed beam toward the first transmissive region. The first detection signal may represent the light quantity of the multiplexed beam passing through the first transmissive region.

According to the aforementioned configuration, since the first defining portion defines the first transmissive region which allows transmission of the multiplexed beam, the first signal generator may selectively receive a component of the multiplexed beam which is suitable for generating the sample image.

In the aforementioned configuration, the multiplexed beam may include 0th-order interfering light, and higher-order interfering light which is higher in order than the 0th-order interfering light. A light quantity of the 0th-order interfering light passing through the first transmissive region may be larger than a light quantity of the higher-order interfering light while the first signal generator generates the signal component.

According to the aforementioned configuration, the first signal generator may selectively receive the 0th-order interfering light of the multiplexed beam which is suitable for generating the sample image.

In the aforementioned configuration, the objective lens may have a focal distance f. The first transmissive region may be a pinhole having a hole diameter d. The first condenser may be a lens having a focal distance f1. The hole diameter d may satisfy a relationship given by Expression 12.

According to the aforementioned configuration, since the relationship given by the aforementioned expression is satisfied, the multiplexed beam having high coherency is generated.

In the aforementioned configuration, the image generation device may further include a second signal generator which generates a second detection signal in correspondence to a light quantity of a transmitted beam passing through the sample. The image generator may use the signal component to generate a reflection image of the sample as the sample image and the second detection signal to generate a transmission image of the sample as the sample image.

According to the aforementioned configuration, the observer may observe not only the reflection image of the sample but also the transmission image of the sample.

In the aforementioned configuration, the image generator may use the signal component and the second detection signal to generate a combined image as the sample image in which the reflection image and the transmission image are combined.

According to the aforementioned configuration, the observer may observe a combined image in which the reflection image and the transmission image are combined.

In the aforementioned configuration, the image generation device may further include a second defining portion configured to define a second transmissive region, which allows transmission of the transmitted beam, and a second condenser, which condenses the transmitted beam toward the second transmissive region. The second detection signal may represent the light quantity of the transmitted beam passing through the second transmissive region.

According to the aforementioned configuration, since the second defining portion defines the second transmissive region which allows transmission of the transmitted beam, the second signal generator may selectively receive a component of the transmitted beam which is suitable for generating the transmission image.

In the aforementioned configuration, the laser source portion may include a first laser source, which emits a first laser beam as the laser beam, and a second laser source, which emits a second laser beam as the laser beam, the second laser beam being different in wavelength from the first laser beam. The first detection signal may include a first signal in correspondence to the first laser beam and a second signal in correspondence to the second laser beam. The image generator may generate a plurality of the sample images from the first and second signals.

According to the aforementioned configuration, since the second laser beam is different in wavelength from the first laser beam, the second laser beam is different in hue from the first laser beam. Therefore, the sample image may use various hues to represent the sample.

In the aforementioned configuration, the laser source portion may include a red laser source, which emits a red laser beam as the laser beam, a green laser source, which emits a green laser beam as the laser beam, and a blue laser source, which emits a blue laser beam as the laser beam. The first detection signal may include a red signal in correspondence to the red laser beam, a green signal in correspondence to the green laser beam, and a blue signal in correspondence to the blue laser beam. The image generator may generate a plurality of sample images from the red, green and blue signals.

According to the aforementioned configuration, the sample image may represent the sample using red, green and blue hues.

In the aforementioned configuration, the red laser beam may have a wavelength $\lambda 1$. The green laser beam may have a wavelength $\lambda 2$. The blue laser beam may have a wavelength $\lambda 3$. The wavelength $\lambda 1$ may satisfy a relationship given by $0.60\ \mu m \leq \lambda 1 \leq 0.64\ \mu m$. The wavelength $\lambda 2$ may satisfy a relationship given by $0.50\ \mu m \leq \lambda 2 \leq 0.54\ \mu m$. The wavelength $\lambda 3$ may satisfy a relationship given by $0.44\ \mu m \leq \lambda 3 \leq 0.48\ \mu m$.

According to the aforementioned configuration, the sample image may use red, green and blue hues to represent the sample.

An image generation method according to another aspect of the aforementioned embodiments may he used for generating a sample image representing a sample. The image generation method includes an emission step of emitting a laser beam, a conversion step of converting the laser beam into a multiplexed beam, in which a reflected beam resulting from reflection of the laser beam by the sample and a reference beam resulting from modulation of a phase of the laser beam are multiplexed, a first signal generation step of generating a first detection signal in correspondence to a light quantity of the multiplexed beam, and an image generation step of generating the sample image. The conversion step includes modulating the phase to cause a periodic variation of the light quantity. The first signal generation step includes generating, a signal component which represents a change from an increase to a decrease in the periodic variation. The image generation step includes using the signal component to generate the sample image.

According to the aforementioned configuration, since the sample image is generated from the signal component representing a change from an increase to a decrease in the periodic variation, an observer may observe a bright sample image without an excessive increase in power of the laser beam.

In the aforementioned configuration, the conversion step may include demultiplexing the laser beam into a first demultiplexed beam for generating the reflected beam and a second demultiplexed beam for generating the reference beam, condensing the first demultiplexed beam toward the sample to form a focal point, adjusting a positional relationship between the sample and the focal point in a direction of an optical path of the first demultiplexed beam, and correcting spherical aberration of the first demultiplexed beam on the basis of the positional relationship.

According to the aforementioned configuration, since the spherical aberration is corrected on the basis of the positional relationship between the sample and the focal point, the focal point may become suitable for observation of the sample.

In the aforementioned configuration, the image generation method may further include a second signal generation step of generating a second detection signal in correspondence to a light quantity of the first demultiplexed beam passing through the sample. The image generation step may include using the signal component and the second detection signal to generate the sample image.

According to the aforementioned configuration, an observer may observe the sample image represented by the reflected beam from the sample and the transmitted beam passing through the sample.

In the aforementioned configuration, the image generation step may generate the sample image on the basis of a difference between the signal components with and without the sample.

According to the aforementioned configuration, the sample image has a high contrast.

INDUSTRIAL APPLICABILITY

The principles of the aforementioned various embodiments are applicable to technical fields which require a sample image represented with a high optical resolution or other technical fields which require a bright reflection image.

The invention claimed is:

1. An image generation device for generating a sample image representing a sample comprising:
   a laser source portion configured to emit a laser beam;
   a convertor configured to demultiplex the laser beam into a first demultiplexed beam, which is propagated to the sample, and a second demultiplexed signal;
   a modulator configured to modulate the phase of the second demultiplexed beam to generate a reference beam;
   wherein the converter is configured to multiplex a reflected beam resulting from reflection of the first demultiplexed beam by the sample and the reference beam resulting from modulation of the phase of the second demultiplexed beam to generate a multiplexed beam;
   a first signal generator configured to generate a first detection signal in correspondence to a light quantity of the multiplexed beam, the first detection signal taken in an interval in which the light quantity of the multiplexed beam changes over at least one period; and
   an image generator which exclusively extracts a signal component within one period of the first detection signal, the signal component being a maximum value of a voltage level of the first detection signal at which the voltage level of the first detection signal changes from an increase to a decrease, and generates the sample image using, from the first detection signal, only the extracted signal component.

2. The image generation device according to claim 1, wherein the convertor includes an objective lens, which condenses the first demultiplexed beam toward the sample,
wherein a numerical aperture of the objective lens is NA, and
wherein the numerical aperture NA satisfies a relationship given by NA>0.322.

3. The image generation device according to claim 1, wherein the modulator includes a reflector, which reflects the second demultiplexed beam to generate the reference beam, and a displacement mechanism, which displaces the reflector along an optical path of the second demultiplexed beam to cause the periodic variation.

4. The image generation device according to claim 3, wherein the displacement mechanism displaces the reflector within an interval in which the light quantity of the multiplexed beam varies only over one period.

5. The image generation device according to claim 1, wherein the modulator includes a reflection mechanism which has a refractive index changing under an electro-optical effect, the reflection mechanism reflecting the second demultiplexed beam to generate the reference beam, and
wherein the reflection mechanism changes the refractive index to cause the periodic variation.

6. The image generation device according to claim 5, wherein the reflection mechanism changes the refractive index within a range in which the light quantity varies only over one period.

7. The image generation device according to claim 2, wherein the convertor includes a positional adjuster configured to adjust a relative positional relationship between the sample and a focal point generated by the objective lens in a direction along an optical path of the first demultiplexed beam.

8. The image generation device according to claim 7, wherein the convertor includes a first corrector situated between the converter and the objective lens and configured to correct spherical aberration of the first demultiplexed beam, and
wherein the first corrector corrects the spherical aberration on the basis of the positional relationship.

9. The image generation device according to claim 2, wherein the convertor includes a first defining portion configured to define a first transmissive region, which allows transmission of the multiplexed beam, and a first condenser configured to condense the multiplexed beam to the first transmissive region, and
wherein the first detection signal represents the light quantity of the multiplexed beam passing through the first transmissive region.

10. The image generation device according to claim 9, wherein the multiplexed beam includes 0th-order interfering light, and higher-order interfering light which is higher in order than the 0th-order interfering light, and
wherein a light quantity of the 0th-order interfering light passing through the first transmissive region is larger than a light quantity of the higher-order interfering light while the first signal generator generates the first detection signal.

11. The image generation device according to claim 9, wherein the objective lens has a focal distance f,
wherein the first transmissive region is a pinhole having a hole diameter d,
wherein the first condenser is a lens having a focal distance f1,
wherein a wavelength of the multiplexed beam is λ, and
wherein the hole diameter d satisfies a relationship given by Expression 1:

$$d \leq \frac{2.44\lambda}{2NA} \times \frac{f1}{f}. \qquad \text{[Expression 1]}$$

12. The image generation device according to claim 1, further comprising:
a second signal generator configured to generate a second detection signal in correspondence to a light quantity of a transmitted beam passing through the sample,
wherein the image generator uses the first detection signal to generate a reflection image of the sample as the sample image and the second detection signal to generate a transmission image of the sample as the sample image.

13. The image generation device according to claim 12, wherein the image generator uses and the first and second detection signals to generate a combined image as the sample image in which the reflection image and the transmission image are combined.

14. The image generation device according to claim 12, further comprising:
a second defining portion configured to define a second transmissive region which allows transmission of the transmitted beam; and
a second condenser which condenses the transmitted beam toward the second transmissive region,
wherein the second detection signal represents the light quantity of the transmitted beam passing through the second transmissive region.

15. The image generation device according to claim 1, wherein the laser source portion includes a first laser source, which emits a first laser beam as the laser beam, and a second laser source, which emits a second laser beam as the laser beam, the second laser beam being different in wavelength from the first laser beam,
the first detection signal includes a first signal in correspondence to the first laser beam, and a second signal in correspondence to the second laser beam, and
the image generator generates a plurality of sample images from the first and second signals.

16. The image generation device according to claim 1, wherein the laser source portion includes a red laser source, which emits a red laser beam as the laser beam, a green laser source, which emits a green laser beam as the laser beam, and a blue laser source, which emits a blue laser beam as the laser beam,
wherein the first detection signal includes a red signal in correspondence to the red laser beam, a green signal in correspondence to the green laser beam, and a blue signal in correspondence to the blue laser beam, and
wherein the image generator generates a plurality of the sample images from the red, green and blue signals.

17. The image generation device according to claim 16, wherein the red laser beam has a wavelength λ1,
wherein the green laser beam has a wavelength λ2,
wherein the blue laser beam has a wavelength λ3, wherein the wavelength λ1 satisfies a relationship given by 0.60 μm≤λ1≤0.64 μm, the wavelength λ2 satisfies a relationship given by 0.50 μm≤λ2≤0.54 μm, and the wavelength λ3 satisfies a relationship given by 0.44 μm≤λ3≤0.48 μm.

18. An image generation method for generating a sample image representing a sample, the method comprising:
   emitting a laser beam;
   demultiplexing the laser beam into a first demultiplexed beam, which is propagated to the sample, and a second demultiplexed signal;
   modulating the phase of the second demultiplexed beam to generate a reference beam;
   a conversion step of multiplexing a reflected beam resulting from reflection of the first demultiplexed beam by the sample and the reference beam resulting from modulation of the phase of the second demultiplexed beam to generate a multiplexed beam;
   a first signal generation step of generating a first detection signal in correspondence to a light quantity of the multiplexed beam, the first detection signal taken in an interval in which the light quantity of the multiplexed beam changes over at least one period; and
   an image generation step of exclusively extracting a signal component within one period of the first detection signal, the signal component being a maximum value of a voltage level of the first detection signal at which the voltage level of the first detection signal changes from an increase to a decrease, and generating the sample image using, from the first detection signal, only the extracted signal component.

19. The method according to claim 18,
   wherein the conversion step includes condensing the first demultiplexed beam toward the sample to form a focal point, adjusting a positional relationship between the sample and the focal point in a direction of an optical path of the first demultiplexed beam, and correcting spherical aberration of the first demultiplexed beam on the basis of the positional relationship.

20. The method according to claim 19, further comprising:
   a second signal generation step of generating a second detection signal in correspondence to a light quantity of the first demultiplexed beam passing through the sample,
   wherein the image generation step includes using the first and second detection signals to generate the sample image.

21. The method according to claim 18,
   wherein the image generation step generates the sample image on the basis of a difference between the first detection signals with and without the sample.

* * * * *